(12) United States Patent
Charalambous et al.

(10) Patent No.: US 10,635,068 B2
(45) Date of Patent: Apr. 28, 2020

(54) INFORMATION TRANSFER IN STOCHASTIC OPTIMAL CONTROL THEORY WITH INFORMATION THEORETIC CRITERIAL AND APPLICATION

(71) Applicant: Charalambos D. Charalambous, Nicosia (CY)

(72) Inventors: Charalambos D. Charalambous, Nicosia (CY); Christos K. Kourtellaris, Nicosia (CY); Ioannis Tzortzis, Nicosia (CY)

(73) Assignee: Charalambos D. Charalambous, Nicosia (CY)

( * ) Notice: Subject to any disclaimer, the term of this patent is extended or adjusted under 35 U.S.C. 154(b) by 105 days.

(21) Appl. No.: 15/461,462

(22) Filed: Mar. 16, 2017

(65) Prior Publication Data

US 2017/0269560 A1    Sep. 21, 2017

Related U.S. Application Data

(60) Provisional application No. 62/309,315, filed on Mar. 16, 2016.

(51) Int. Cl.
*G05B 19/04* (2006.01)
*G05B 19/042* (2006.01)

(52) U.S. Cl.
CPC .. *G05B 19/0421* (2013.01); *G05B 2219/2224* (2013.01); *G05B 2219/25155* (2013.01)

(58) Field of Classification Search
CPC ........ G05B 19/0421; G05B 2219/2224; G05B 2219/25155
See application file for complete search history.

(56) References Cited

U.S. PATENT DOCUMENTS

| 6,192,238 | B1 | 2/2001 | Piirainen |
| 7,676,007 | B1 | 3/2010 | Choi et al. |
| 2005/0010400 | A1* | 1/2005 | Murashima ............. G10L 19/08 704/219 |
| 2011/0125702 | A1 | 5/2011 | Gorur Narayana Srinivasa et al. |
| 2013/0007264 | A1 | 1/2013 | Effros et al. |
| 2013/0287068 | A1* | 10/2013 | Ashikhmin ........... H04L 5/0046 375/219 |
| 2015/0098533 | A1 | 4/2015 | Rusek |

FOREIGN PATENT DOCUMENTS

| WO | WO-2008/024967 A2 | 2/2008 |
| WO | WO-2009/084896 A2 | 7/2009 |

OTHER PUBLICATIONS

C.E. Shannon, "A mathematical theory of communication", *Bell Syst. Tech*, vol. 27, Jul. 1948 (Reprinted).

(Continued)

*Primary Examiner* — Kabir A Timory
(74) *Attorney, Agent, or Firm* — Marshall, Gerstein & Borun LLP

(57) ABSTRACT

The current disclosure provides a method for transmitting encoded information signals through a control system and to a decoder. The encoded information signals are transmitted along with control signals as an encoded message. The information signals are encoded based at least in part on a control-coding capacity of the control system.

14 Claims, 2 Drawing Sheets

(56) References Cited

OTHER PUBLICATIONS

C.E. Shannon, "Coding theorems for a discrete source with a fidelity criterion," *IRE Nat. Conv. Rec., pt. 4*, vol. 27, pp. 325-350, Jul. 1950.

T.M. Cover and J.A. Thomas, *Elements of Information Theory*, 2nd ed. John Wiley & Sons, Inc., Hoboken, New Jersey, 2006.

P.R. Kumar and P. Varaiya, *Stochastic Systems: Estimation, Identification, and Adaptive Control*. Prentice Hall, 986. [5] C.D. Charalambous, C.K. Kourtellaris, and I. Tzortzis, Information transfer in stochastic optimal control with randomized strategies and directed information criterion, in *55th IEEE Conference on Decision and Control (CDC)*, Dec. 12-14, 2016.

J.L. Massey, "Causality, feedback and directed information", in *International Symposium on Information Theory and its Applications (ISITA '90)*, Nov. 27-30, 1990 (Pre-Print).

H. Permuter, T. Weissman, and A Goldsmith, "Finite state channels with time-invariant deterministic feedback," *IEEE Trans. Inf. Theory*, vol. 55, No. 2, pp. 644-662, Feb. 2009.

C.D. Charalambous and P.A. Stavrou, "Directed information on abstract spaces: Properties and variational equalities", *IEEE Transactions on Information Theory*, vol. 62, No. 11, pp. 6019-6052, 2016.

G. Kramer, "Capacity results for the discrete memoryless network", *IEEE Transactions on Information Theory*, vol. 49, No. 1, pp. 4-21, Jan. 2003.

R. S. Liptser and A. N. Shiryaev, *Statistics of Random Processes: I. General Theory*, 2nd ed. Springer-Verlag, Berlin, New York 2001.

J.P.M. Schalkwijk and T. K ailath, "A coding scheme for additive noise channels with feedback-I: no bandwidth constraints," *IEEE Transactions on Information Theory*, vol. 12, pp. 172-182, Apr. 1966.

Blahut, "Computation of channel capacity and rate-distortion functions", IEEE Transactions on Information Theory, vol. 18, No. 4, pp. 460-473, Jul. 1972.

Chen et al., "The Capacity of Finite-State Markov Channels with Feedback", IEEE Transactions on Information Theory, vol. 51, No. 3, pp. 780-798, Mar. 2005.

Cover et al., "Gaussian Feedback Capacity," IEEE Transactions on Information Theory, vol. 35, No. 1, pp. 37-43, Jan. 1989.

Dobrushin, "General Formulation of Shannon's Main Theorem of Information Theory," Usp. Math. Nauk., vol. 14, pp. 3-104, 1959, translated in Am. Math. Soc. Trans., 33:323-438.

Dobrushin, "Information Transmission in a Channel with Feedback," Theory of Probability and its Applications, vol. 3, No. 2, pp. 367-383, 1958.

Elishco et al., "Capacity and Coding of the Ising Channel with Feedback," IEEE Transactions on Information Theory, vol. 60, No. 9, pp. 3138-5149, Jun. 2014.

Gamal et al., *Network Information Theory*, Cambridge University Press, Dec. 2011.

Kim, "A Coding Theorem for a Class of Stationary Channels with Feedback," IEEE Transactions on Information Theory, vol. 54, No. 4, pp. 1488-1499, Apr. 2008.

Kim, "Feedback Capacity of Stationary Gaussian Channels," IEEE Transactions on Information Theory, vol. 56, No. 1, pp. 57-85, 2010.

Kramer, "Topics in Multi-User Information Theory," Foundations and Trends in Communications and Information Theory, vol. 4, Nos. 4-5, pp. 265-444, 2007.

Permuter et al., "Capacity of a Post Channel With and Without Feedback," IEEE Transactions on Information Theory, vol. 60, No. 9, pp. 5138-5149, 2014.

Permuter et al., "Capacity of the Trapdoor Channel with Feedback," IEEE Transactions on Information Theory, vol. 56, No. 1, pp. 57-85, Apr. 2010.

Tatikonda et al., "The Capacity of Channels with Feedback," IEEE Transactions on Information Theory, vol. 55, No. 1, pp. 323-349, Jan. 2009.

Verdu et al., "A General Formula for Channel Capacity," IEEE Transactions on Information Theory, vol. 40, No. 4, pp. 1147-1157, Jul. 1994.

Yang et al., "Feedback Capacity of Finite-State Machine Channels," Information Theory, IEEE Transactions on, vol. 51, No. 3, pp. 799-810, Mar. 2005.

Yang et al., "On the Feedback Capacity of Power-Constrained Gaussian Noise Channels with Memory," IEEE Transactions on Information Theory, vol. 53, No. 3, pp. 929-954, Mar. 2007.

European Search Report in Corresponding EP Application No. 15165990.1, dated Sep. 24, 2015.

Non-Final Office Action in U.S. Appl. No. 14/700,495 dated Oct. 2, 2015.

Notice of Allowance in U.S. Appl. No. 14/700,495 dated Feb. 12, 2016.

C.D. Charalambous et al., "Stochastic Optimal Control with Randomized Strategies and Directed Information Criterion," 8 pgs.

C.D. Charalambous et al., "The Value of Information & Information Transfer in Stochastic Optimal Control Theory," 8 pgs.

R. E. Blahut, "Principles and Practice of Information Theory," ser. in Electrical and Computer Engineering. Reading, MA: Addison-Wesley Publishing Company, 1987.

R. T. Gallager, "Information Theory and Reliable Communications," John Wiley & Sons, Inc., Hoboken, New Jersey 2006.

I. I. Gihman and A. V. Skorohod, "Controlled Stochastic Processes," Springer-Verlag, 1979.

O. Hernandez-Lerma and J. Lasserre, "Discrete-Time Markov Control Processes: Basic Optimality Criteria," ser. Applications of Mathematics Stochastic Modelling and Applied Probability, Springer-Verlag, 1996.

G. Kramer, "Directed Information for Channels with Feedback," Ph.D. dissertation, Swiss Federal Institute of Technology (ETH), Dec. 1998.

N. U. Ahmed and C. D. Charalambous, "Stochastic Minimum Principle for Partially Observed Systems Subject to Continuous and Jump Diffusion Processes and Driven by Relaxed Controls," SIAM Journal on Control Optimization, vol. 51, No. 4, pp. 3235-3257, 2013.

H. Marko, "The Bidirectional Communication Theory—A Generalization of Information Theory," IEEE Transactions on Communications, vol. 21, No. 12, pp. 1345-1351, Dec. 1973.

C. Kourtellaris and C. D. Charalambous, "Information Structures of Capacity Achieving Distributions for Feedback Channels With Memory and Transmission Cost: Stochastic Optimal Control & Variational Equalities—Part I," IEEE Transactions on Information Theory, 2015, submitted, Nov. 2015.

P. E. Caines, "Linear Stochastic Systems," ser. Wiley Series in Probability and Statistics, John Wiley & Sons, Inc., New York 1988.

M. Pinkser, "Information and Information Stability of Random Variables and Processes", Holden-Day Inc., San Francisco, 1964.

S. Ihara, "Information Theory for Continuous Systems", World Scientific 1993.

* cited by examiner

INFORMATION TRANSFER IN STOCHASTIC OPTIMAL CONTROL THEORY WITH INFORMATION THEORETIC CRITERIAL AND APPLICATION

CROSS-REFERENCE TO RELATED APPLICATIONS

This application claims priority to and the benefit of the filing date of U.S. Provisional Patent Application Ser. No. 62/309,315, which was entitled "The Information Transfer in Stochastic Optimal Control Theory with Information Theoretic Criterial and Application" and filed on Mar. 16, 2016. The entire disclosure of this application is hereby expressly incorporated by reference herein for all uses and purposes.

TECHNICAL FIELD

This patent application generally relates to coding of information signals in controllers of general control systems, and using the control system to communicate the encoded information to processes connected to control systems, such as field devices, outputs, other controllers or processors. The invention further relates to: (i) controller design in control systems with a dual role, (ii) achieving stability and optimal performance with respect to control objectives, (iii) encoding information, (iv) transferring the information through the control system, and (v) decoding or estimating the information at outputs of control systems, with arbitrary small error probability. The invention facilitates communication from one processor of a control system to another processor.

BACKGROUND

Current telecommunication and information technology systems are designed based on Shannons operational definitions of coding-capacity, the maximum rate of communicating information over noisy channels, and coding-compression, the minimum rate of compressing information, which give the fundamental performance limitations for reliable communication. They utilize encoders and decoders, to combat communication noise and to remove redundancy in data.

Current dynamical control systems are designed by utilizing feedback controllers, actuators and sensors, to ensure stability, robustness, and optimal control objectives and performance.

Industries related to modern control and communication systems have experienced tremendous growth due to their increasing applications in information technology which affects everyday lives of people. The next generation of engineering systems integrates control, communication, protocols, etc. to develop complex engineering systems, which can be implemented in energy systems, transportation systems, medical systems, surveillance networks, financial instruments etc. Many of these applications consist of multiple control sub-systems and communication sub-systems integrated together to achieve control and communication objectives.

In the field of communication most systems are designed by utilizing encoders and decoders, to combat communication noise and to remove redundancy in data. Current telecommunication systems, whether point-to-point, network, mobile, etc., are designed, based on Shannon's operational definitions, which give the maximum rate of communicating information over noisy channels, and the minimum rate of compressing data generated by sources, called coding-capacity of communication channels, and coding-compression of information processes, respectively.

In the field of modern control theory and applications, controllers are designed to control the control system outputs, to optimize performance and to achieve robustness with respect to uncertainties and noise. Over the year the criterion of optimality of controllers is the average of a real-valued sample path pay-off functional, of the control, state and output processes, which is optimized to achieve optimal control performance. It is well-known that controllers are designed to control the control systems but not to encode information and communicate this information, through the control system to other processes.

The general separation of control system design and communication system design has divided the community of developers into independent groups developing controllers for control systems, and communication systems for noisy channels. Shannon's operational definitions of achievable coding-capacity, and coding-compression, which utilizes encoders and decoders, to combat communication noise and to remove redundancy in data, did not apply beyond communication system, such as, in the ability of control system to transmit information.

To this date, no controllers in a control system is designed to communicate information, from one controller, through the control system, to another controller, or to any of its outputs, or from elements of a control system to elements of another control system, using encoders and decoders as done in problems of information transmission over noisy channels.

To this date, Shannon's operational definitions of coding-capacity and coding-compression are not used beyond communication system, such as, in dynamical control system. It is well-known that encoders are designed to encode and transmit information over noisy communication channels but not to control channel output processes.

SUMMARY

In an embodiment, a method of designing an controller-encoder pair in control systems or general dynamical systems or decision systems, comprising the controller controls the control system, the encoder encodes information signals and transmits the information over the control system to any element attached to it, and reconstruct the encoded signals using decoders, with arbitrary small error probability.

The method described above further includes determining the expression of Control-Coding Capacity (CC-Capacity) of the control system, for stable or unstable systems, wherein the expression represents the maximum rate in bits/second of simultaneously controlling the control system and encoding information, and decoding the information at any processors attached to the control system, by solving the expression of CC-Capacity.

The method of above further includes simultaneous
(i) optimal performance with respect to control objectives, and
(ii) optimal coding of information signals with respect to communication objectives.

The method of above further includes the specification of minimum power necessary to meet the optimal performance with respect to control objectives, and the specification of excess power which is converted into transmitting information through control systems with positive data rates.

In another embodiment, the controller-encoder comprise of deterministic part and a random part, wherein the deterministic part controls the control system, while the random part encodes information.

The method further includes determining how existing controllers which are not designed to encode information, can be modified to encode information, and transmit information over control systems, and decoded at any processors attached to the control system, such as, in control-to-control communication, etc.

DETAILED DESCRIPTION

The techniques of the present disclosure facilitate a method of controller design in control systems or decision systems, which is based on utilizing controllers, encoders and decoders, wherein the encoders and decoders are designed using techniques from communication system designs. Further, these techniques may be universal to any dynamical system with control inputs and outputs. The maximum rate for simultaneous control of the dynamical system and transmission of information over the dynamical system is called the Control-Coding Capacity (CC-Capacity).

The design of the controller-encoder for control systems, aims at simultaneous control of the control system and communication of information from one processor to another processor. More specifically, the CC-Capacity of dynamical control systems identifies the interaction of control and information, and controller-encoders-decoders are designed to achieve simultaneously optimal performance with respect to control objectives, and optimal transmission of information, via the dynamical system, from one controller to another controller or output, etc.

Applications of the CC-Capacity to control systems, and in general, to any dynamical system with inputs and outputs, include biological, financial, quantum, etc., because any such system has CC-Capacity.

To this end, a methodology determines how to design control systems, which in addition to effectively control system outputs (e.g., stabilize them), they also encode information, and communicate the information from one controller to any other controller, via the control system which acts as a communication channel, and the information is decoded or estimated at other processors attached to the control system, with arbitrary precision.

Dynamical Systems or Control Systems with Communication Capabilities

Figure 1:
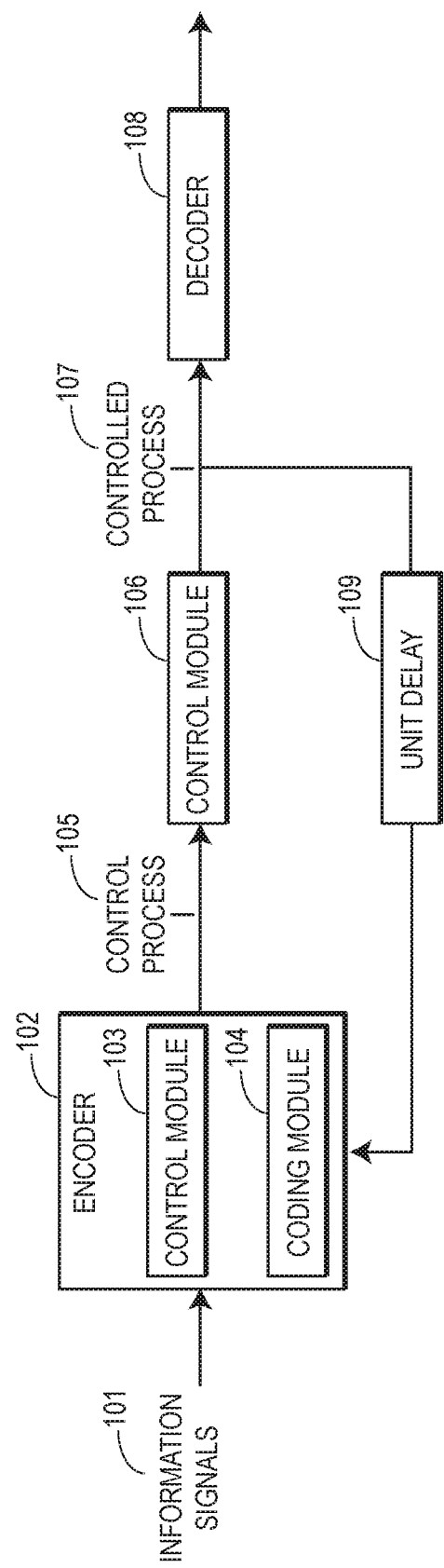
FIG. 1 is a block diagram of an example of controller-encoder of a control system, which simultaneously controls the control system and encodes an information signals, and transmits the information signals over the control system, and decodes the information signals at the output of a decoder and/or estimator.

FIG. 1 is a block diagram of an example dynamical system or control system 100 including at least some components that may be configured according to and/or utilize the methods discussed herein. In this example system, an information signal 101 is received (e.g., including any suitable information). A randomized strategy also called controller-encoder 102 is designed to control the control system 106 and to encode the information signals 101, the control process or encoded message 105, including a control signal and an encoded information signal, is transmitted as a signal over the dynamical system also called control system 106. A decoder or estimator 108 decodes the process output 107, which is the output of the encoded message 105 after going through the control system 106, to produce an estimate of the information signal 101. The process output 107 is also returned to the controller-encoder 102 as feedback. In some embodiments the process output may be delayed before being returned to the controller/encoder.

The information signal 101 includes analog or digital data. For example, the information signal may include suitable computer generating messages, including digital data, such as digital data representing pictures, text, audio, videos, or signals generated by other control systems to etc. Generally, the information signal 101 may include any number of devices or components of devices generating messages to be encoded by the randomized strategy also called controller-encoder 102 and transmitted over the control system 106. The information signal 101 may include information sources and/or tracking signals as well as any other pertinent data that may be encoded and transmitted through the control system.

The randomized strategy called controller-encoder 102 encodes messages received from the information signals 101 $\{X_0, X_1, \ldots, X_n\}$ and uses feedback from the control system outputs $\{Y_0, \ldots, Y_n\}$ to generated the control process $\{A_0, \ldots, A_n\}$. The controller/encoder 102 may comprise a control module 103 and a coding module 104. The control module 103 may be used for typical control system activities, such as generating control signals for elements of the control system 106. The control module may also receive feedback 107 and other information related to the control system which may be implemented in controlling the control system. The coding module 104, which is not typical of previous known controller devices, may be implemented in encoding information signals 101 and transmitting the control process 105 as an encoded signal along with control signals to the control system 106. The controller/encoder 102 may implement the control module 103 and coding module 104 in any suitable combination to produce the control process 105. In some embodiments, the control process 105 can be represented as a randomized control signal or a randomized control action.

The coding module 104 may implement any of the techniques described below to encode the information signals 101. For example, the encoding module may be designed based on the capacity of the control system, known as the control-coding capacity, of one or more control systems 106 and then encode the signals based on the determined capacity. Further, the coding module 104 may also implement any known or future developed schemes for encoding the information signal 101.

The dynamical system also called control system 106 may include any number of systems, described by nonlinear recursive models driven by a control process and the noise process, such as, the dynamics of a ship, submarine, missile, plane, car, and any model of a dynamical system which is controlled by a controller, such as a process control system. The output of the control system 107 is available to the decoder or estimator 108 and comprises encoded information signals and control signal feedback. The decoder 108 may be any device suitable for receiving the encoded information signals from the process output 107 such as a sensor, field device, another controller, etc. In the example of FIG. 1 the control system or dynamical system 106 is described by a sequence of conditional distributions $\{P_{Y_i|Y^{i-1},A^i}:i=0,\ldots,n\}$ called conditional distributions or control system distributions.

Figure 2:
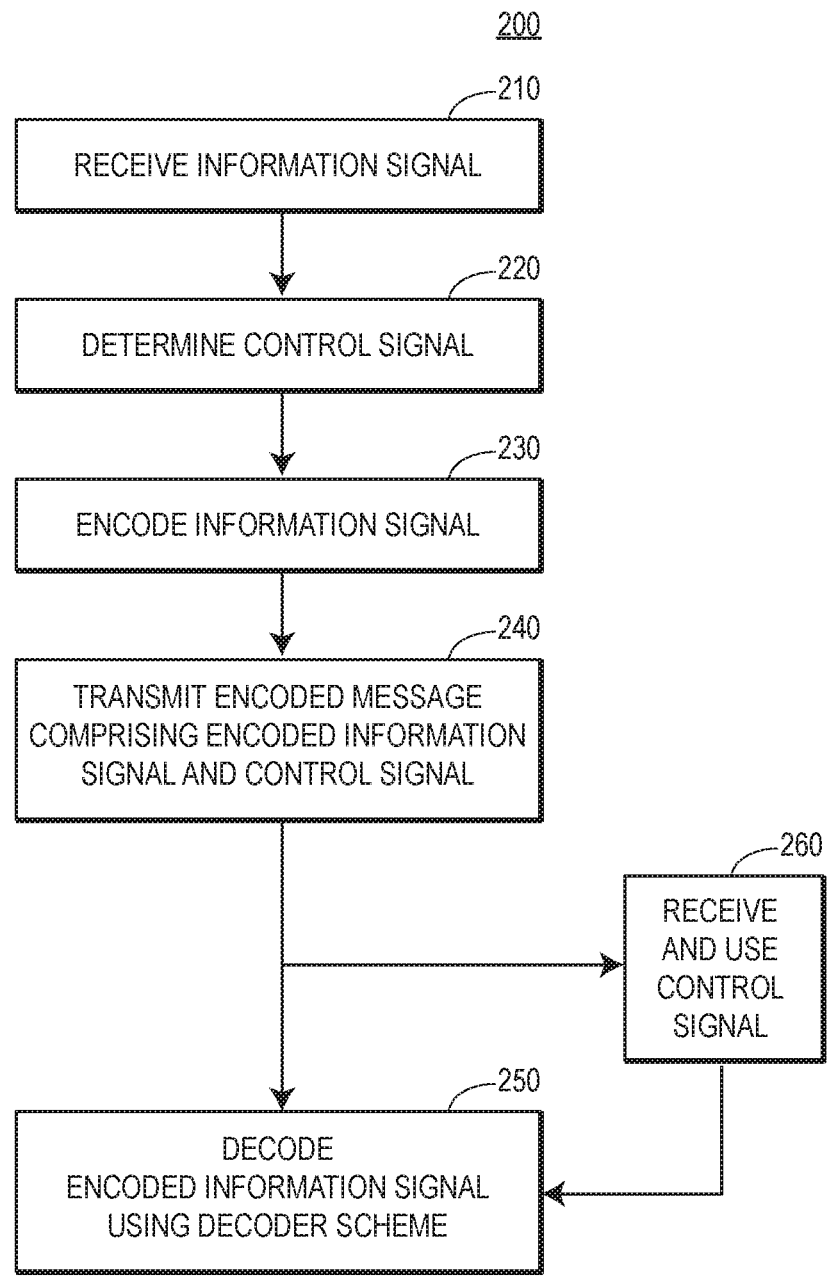
FIG. 2 is a flow chart depicting a method of an example method for transmitting encoded information signals and control signals in a control system.

FIG. 2 is a flow chart of an example method for transmitting encoded signals through a control system. The method starts at block 210 when an information signal is received by a controller of a control system. The information signal can be of any form discussed above with regard to FIG. 1. At block 220, a controller may determine one or more control signals that to be sent to the control system. At block 230, the received information signals may be encoded. The information signals may be encoded by the controller at a coding module, for example. The information signals may also be encoded based on any of the techniques discussed herein. Next, at block 240 the controller may transmit the encoded information signals along with the control signals through the control system.

Previous systems would only transmit control signals through control systems. These previous systems lacked the capability of sending information signals in such a manner. For example, if information needed to be transmitted through a control system or from one controller to another controller in the control system, this was not enabled by the previous systems. Instead, previous systems would require additional communication channels for communicating information signals and they do not use the control systems as communication channels used to transmitting information signals. In other words, by transmitting encoded messages which include both control signals and encoded information signals through the control system, the current system enables simultaneous control and communication of data transmission. Further, the current system requires further utilizes the control system as a communication channel and also provides more optimized communications through currently available control systems. The implementation of such techniques was not previously considered (using communication channel optimization techniques in a control system).

The encoded message transmitted in block 240 may be utilized at two different junctures because the encoded message essentially contains two parts, an encoded information signal and one or more control signals. At block 250 the encoded information signal portion may be decoded. The encoded portion may be decoded by a decoder as described above with respect to FIG. 1. In an embodiment, the encoded signal may be decoded using a particular preset encoder scheme. In another embodiment, the encoded signal may indicate the encoder scheme to be used for decoding the message.

At block 260, the control signal portion may be received by the control system. The control signal portion may be used to control one or more elements of the control system. In an embodiment, once the control signal is received, feedback may be generated by the device or devices that have received and utilized the control signal. For example, feedback may be generated and transmitted as part of process output, such as process output 107 discussed above with respect to FIG. 1. The control signals may be received by a controller, a field device, a sensor, or any other suitable device in a control system.

Although blocks 250 and 260 are discussed in sequential order, these steps may take simultaneously or in any suitable order. In an embodiment, the present techniques allow the control system to be used as a communication channel for transmitting an encoded information signal from a controller to another device which may decode the encoded information signal.

All elements of dynamical systems or control systems 106 with communication capabilities shown in FIG. 1 are analogous to elements source, encoder, channel, decoder of transmitting information through noisy communication channels, as explained below.

(i) $A^n \triangleq \{A_0,\ldots,A_n\}$ is the control process of the control system, and $A^n = a^n \in \times_{i=0}^n \mathbb{A}_i^n$ the control actions. This is analogous to channel inputs in problems of information transmission over noisy communication channels.

(ii) $Y^n \triangleq \{Y^{-1}, Y_0, \ldots, Y_n\}$ is the output process of the control system taking values in $\times_{i=-\infty}^n \mathbb{Y}_i$, and $Y^{-1}$ is the initial state. This is analogous to channel outputs in problems of information transmission over noisy communication channels.

(iii) $\{P_{Y_i|Y^{i-1},A^i}:i=0,\ldots,n\}$ is the control system conditional distribution. This is analogous to the channel distribution of the communication channel in problems of information transmission over noisy communication channels.

(iv) $\{P_{A_i|A^{i-1},Y^i}:i=0,\ldots,n\}$ is the randomized control strategy or conditional distribution of the control process. This is analogous to channel input conditional distribution in problems of information transmission over noisy communication channels.

(v) $X^n \triangleq \{X_i:i=0,\ldots,n\}$ is the information source or tracking signal taking values in $\times_{i=0}^n \mathbb{X}_i$. This is analogous to information source and $X^n = x^n$ the specific message in problems of information transmission over noisy communication channels.

In view of (i)-(v) there is a one-to-one analogy between elements of control systems and elements of noisy communication channels in problems of information transmission. A. Consider a general control system with control process $A^n \triangleq \{A_i:i=0,\ldots,n\}$, output process $Y^n \triangleq \{Y_i:i=\ldots,-1,0,1,\ldots,n\}$, control system conditional distribution $$P_{Y_i|Y^{i-1},A^i} \equiv Q_i(dy_i|y^{i-1},a^i), i=0,\ldots,n$$

a set of randomized control strategies or conditional distribution of the control process $$\mathcal{P}_{[0,n]} \triangleq \{P_{A_i|A^{i-1},Y^{i-1}} \equiv P_i(da_i|a^{i-1},y^{i-1}):i=0,1,\ldots,n\}$$

and a set of randomized control strategies satisfying power constraints defined by the set $$\mathcal{P}_{[0,n]}(k) \triangleq$$
$$\left\{P_i(da_i\mid a^{i-1},y^{i-1}), i=0,\ldots,n: \frac{1}{n+1}E(\ell_{0,n}(A^n,Y^n)) \le k\right\} \subset \mathcal{P}_{[0,n]}$$

where $k \in [0,\infty]$ is the total power with respect to the cost function $l_{0,n}(a^n,y^{n-1}) \in [0,\infty]$.

B. The pay-off of model of A. is the so-called directed information from $A^n$ to $Y_0^n$ conditioned on $Y^{-1}$, denoted by $I(A^n \to Y^n)$ and defined by $$I(A^n \to Y^n) \triangleq \sum_{i=0}^n E\left\{\log\left(\frac{dP_{Y_i|Y^{i-1},A^i}(\cdot\mid Y^{i-1},A^i)}{dP_{Y_i|Y^{i-1}}(\cdot\mid Y^{i-1})}(Y_i)\right)\right\}$$

where $\{P_{Y_i|Y^{i-1}}:i=0,\ldots,n\}$ is distribution generated from $\{Q_i(dy_i|y^{i-1},a^i), P_i(da_i|a^{i-1},y^{i-1}):i=0,1,\ldots,n\}$.

The Finite Time Horizon (FTH) information CC-Capacity of the control system is to determine an optimal randomized control strategy $\{P_i^*(\cdot|\cdot):i=0,\ldots,n\} \in \mathcal{P}_{[0,n]}(\kappa)$ which maximizes the directed information pay-off defined by $$J_{A^n \to Y^n}(P^*, k) \triangleq \sup_{\mathcal{P}_{[0,n]}(\kappa)} I(A^n \to Y^n).$$

The Control-Coding Capacity (CC-Capacity) called the supremum of all transmission rates over the model of A. is the per unit time limiting version $$C(\kappa) \triangleq \lim_{n \to \infty} \frac{1}{n+1} J_{A^n \to Y^n}(P^*, \kappa)$$

C. The method of B. further states that CC-Capacity is analogous to the definition of coding-capacity or capacity in problems of information transmission over noisy communication channels, as follows.
(1) The operational definition of controller-encoder-decoder strategies is a generalization of Shannon's operational definition of coding-capacity in problems of information transmission over noisy channels.
(2) In digital communication theory, the source coding problem can be lossless or lossy (based on quantization), while the channel coding problem is defined with respect to the quantized or compressed representation $X^{(n)}$ of the information process $\{X_i: i=0, \ldots,\}$.

Operational Control-Coding Capacity of Control Systems or Dynamical Systems

Consider a filtered probability space $(\Omega, \mathcal{F}, \{\mathcal{F}_i: i=0, 1, \ldots, N\}, \mathbb{P})$ on which the following processes and RVs are defined.

$$X^{(n)}: \Omega \mapsto \mathcal{M}^{(n)} \triangleq \{1, \ldots, M^{(n)}\}, A_i: \Omega \mapsto \mathbb{A}_i, Y_i: \Omega \mapsto \mathbb{Y}_i, i=0, \ldots, n,$$

$$Y^{-1}: \Omega \mapsto \mathbb{Y}^{-1}, \hat{X}^{(n)}: \Omega \mapsto \mathcal{M}^{(n)}.$$

A controller-encoder-decoder for a dynamical system, such as, a control system, with power constraint, over the time horizon $\{0, 1, \ldots, n\}$ is denoted by

G-SCM:

$$\left( \mathcal{M}^{(n)}, \{\mathbb{A}_i\}_{i=0}^n, \{\mathbb{Y}_i\}_{i=-\infty}^n, \left\{ P(X^{(n)} = x^{(n)}) = \frac{1}{M^{(n)}} : x^{(n)} \in \mathcal{M}^{(n)} \right\}, \right.$$
$$\left. \{g_i(x^{(n)}, a^{i-1}, y^{i-1})\}_{i=0}^n, \{Q_i(dy_i | y^{i-1}, a^i)\}_{i=0}^n, \ell_{0,n}(a^n, y^n), d_n(y^n) \right)$$

and consists of the following elements.
(a) A set of uniformly distributed messages $X^{(n)}$ taking values in $\mathcal{M}^{(n)} \triangleq \{1, \ldots, M^{(n)}\}$, known to both the encoder and decoder (the controller does not need to know these).
(b) A set of controller-encoder strategies mapping messages and feedback control information into control actions defined by $$\mathcal{E}_{[0,n]}^S \triangleq \{g_i: \mathcal{M}_{\mathcal{M}^{(n)}} \times \mathbb{A}^{i-1} \times \mathbb{Y}^{i-1} \mapsto \mathbb{A}_i : i= 0, \ldots, n : a_0 = g_0(x^{(n)}, y^{-1}), a_1 = g_1(x^{(n)}, y^{-1}, a_0, y_0), \ldots, a_n = g_n(x^{(n)}, a^{n-1}, y^{n-1}), x^{(n)} \in \mathcal{M}^{(n)}\}$$

The set of admissible controller-encoder strategies subject to power constraint $\kappa$ is defined by $$\mathcal{E}_{[0,n]}^S(\kappa) \triangleq$$
$$\left\{ g_i(x^{(n)}, a^{i-1}, y^{i-1}), i=0, \ldots, n : \frac{1}{n+1} E^g(\ell_{0,n}(A^n, Y^n)) \le \kappa \right\} \subset \mathcal{E}_{[0,n]}^S$$

where $\kappa \in [0, \infty)$ is the total cost or power of the controller-encoder. For any message $x^{(n)} \in \mathcal{M}^{(n)}$ and feedback information $$u_{x^{(n)}} = (g_0(x^{(n)}, y^{-1}), g_1(x^{(n)}, a^{-1}, y^{-1}, a_0, y_0), \ldots, g_n(x^{(n)}, a^{n-1}, y^{n-1})) \in \mathcal{E}_{[0,n]}^S(\kappa)$$

is the controller-encoder strategy. The control-coding book of the controller-encoder strategy for the message set $\mathcal{M}^{(n)}$ is $\mathcal{C}^{(n)} = (u_1, u_2, \ldots, u_{\mathcal{M}^{(n)}})$.
(c) A decoder measurable mapping $d_n: \mathbb{Y}^n \mapsto \mathcal{M}^{(n)}$, $\hat{X}^{(n)} \triangleq d_n(Y^n)$ such that the average probability of decoding error is given by:
[1] The superscript on expectation, i.e., $P^e$ indicates the dependence of the distribution on the encoding strategies.

$$P_{error}^{(n)} \triangleq P^g\{d_n(Y_n) \ne X^{(n)}\} =$$
$$\frac{1}{M^{(n)}} \sum_{x^{(n)} \in \mathcal{M}^{(n)}} P^g\{d_n(Y^n) \ne x^{(n)} | X^{(n)} = x^{(n)}\} \le \epsilon_n, \epsilon_n \in [0, 1)$$

(d) Conditional independence holds.

$$P_{Y_i | Y^{i-1}, A^i, X^k} = Q_i(dy_i | y^{i-1}, a^i), i=0, 1, \ldots, n, \forall k \in \{0, 1, \ldots\}.$$

(e) The initial data $Y^{-1} \in \mathbb{Y}^{-1}$ and the distribution $\mu(dy^{-1})$ may be known to the controller-encoder and decoder.
(f) The encoder-controller-decoder for the G-SCM is denoted by $(n+1, \mathcal{M}^{(n)}, \epsilon_n, \kappa)$.

The control-coding rate is defined by $$R^{(n)} \triangleq \frac{1}{n+1} \log M^{(n)}.$$

(g) Another class of controller-encoder strategies, which are nonanticipative with respect to the information process $\{X_0, X_1, \ldots\}$ is defined by $$\overline{\mathcal{E}}_{[0,n]}(\kappa) \triangleq \left\{ \{e_i(\cdot, \cdot, \cdot) : i=0, 1, \ldots, n\} \in \overline{\mathcal{E}}_{[0,n]} : \frac{1}{n+1} E^e(c_{0,n}(A^n, Y^n)) \le \kappa \right\}$$

where $$\overline{\mathcal{E}}_{[0,n]} \triangleq \{e_i : \mathbb{X}^i \times \mathbb{A}^{i-1} \times \mathbb{Y}^{i-1} \mapsto \mathbb{A}_i : i=0, \ldots, n : a_o = e_0(x_0, y^{-1}),$$
$$a_1 = g_1(x_0, x_1, y^{-1}, a_0, y_0), \ldots, a_n = g_n(x^n, a^{n-1}, y^{n-1})\}$$

Note the following.
(3) By the above definition, the message $X^{(n)}$ is taken to be uniformly distributed over $\mathcal{M}^{(n)}$, hence its entropy is $H(X^{(n)}) = \log M^{(n)}$. Moreover, unlike most treatments of capacity of communication channels, which often do not impose cost constraints (except for Gaussian channels in which only power constraint on $\{A_i: i=0, \ldots, n\}$ are imposed), the control system is not required to be stable, and there is a cost constraint on both $\{(A_i, Y_i) : i=0, \ldots, n\}$.
(4) If the entropy $H(X^{(n)})$ is below the capacity of the control system, calculated over the time horizon $\{0, 1, \ldots, n\}$, then for large enough n, we expect to achieve the control objective of meeting the average power constraint, and the coding objective to reconstruct a randomly chosen message $X^{(n)} = x^{(n)}$ at the output of the decoder with small probability of error.

Next, we give the precise definition of an achievable control-coding rate and capacity of the control system.

Control-Coding Capacity of Dynamical Systems or Control Systems (h) A control-coding rate R>0 is said to be an achievable rate (under power constraint κ), if there exists a sequence of controller-encoder-decoder strategies $\{(n+1, \mathcal{M}^{(n)}, \epsilon_n, \kappa): n=0, 1, \ldots\}$ such that the random processes $(A^n, Y^n) \equiv (A^{g,n}, Y^{g,n})$ depend on the message $X^{(n)}$, and satisfy $$\lim_{n \to \infty} \epsilon_n = 0 \text{ and } \lim_{n \to \infty} \inf \frac{1}{n+1} \log M^{(n)} \geq R.$$

(i) The operational control-coding capacity of G-SCM under power constraint κ is the supremum of all achievable control-coding rates, i.e., it is defined by $$C(\kappa) \triangleq \sup\{R : R \text{ is achievable}\}.$$

(j) Under appropriate conditions, the CC-Capacity is given by $C(\kappa)$ defined by ( ).

We note the following.

(5) In information theory the operational capacity is often called the coding-capacity of noisy communication channels. Since the objective is to control the control system, in addition to encode information, the operational capacity is called the control-coding capacity.

(6) The definition of CC-Capacity states that if a control-coding rate R is achievable under the power constraint and the control system is operated for sufficiently large n, then we can control the control process $\{Y_i: i=0, 1, \ldots, n\}$ and reconstruct $M^{(n)} = \lceil e^{(n+1)R} \rceil$ messages at the control system output using the decoder or estimator, with arbitrary small probability of error, for sufficiently large n.

(7) As pointed out below, and in view of the general cost constraint, the cost of control is $\kappa_{0,n}(0)$ while the cost of communication is $\kappa_{0,n}(C) - \kappa_{0,n}(0)$.

D. The method of B. further states the optimal randomized strategy $\{P_i^*(\cdot|\cdot): i=0, \ldots, n\} \in \mathcal{P}_{[0,n]}(\kappa)$ is analogous to the optimal channel input conditional distribution in problems of information transmission over noisy communication channels with feedback encoding.

E. An example of the control system is a General-Recursive Control Model (G-RCM) defined as follows.

$$\text{G-RCM}: \begin{cases} Y_i = h_i(Y^{i-1}, A^i, V_i), i = 1, \ldots, n. \\ Y_0 = h_0(Y^{-1}, A_0, V_0), Y^{-1} = y^{-1}, \\ \frac{1}{n+1} \sum_{i=0}^n E\{\gamma_i(T^i A^n, T^i Y^n)\} \leq \kappa \end{cases}$$

where

Assumption A.(i). $\{V_i: i=0, \ldots, n\}$ is the noise process independent of $Y^{-1}$, $h_i: \mathbb{Y}^{i-1} \times \mathbb{A}^i \times \mathbb{Y}_i \mathbb{V} \longmapsto_i$ and $h_i(\cdot, \cdot, \cdot)$, $\gamma_i(\cdot, \cdot)$ are specific functions such as linear or nonlinear, and autoregressive models, etc., with Multiple Inputs and Multiple Outputs, and $(T^i a^n, T^i y^n) \longmapsto \gamma_i(T^i a^n, T^i y^n)$, where $T^i a^n \subseteq \{a_0, a_1, \ldots, a_i\}$, and $T^i y^n \subseteq \{y_0, y_1, \ldots, y_i\}$ for $i=0, \ldots, n$ is any quadratic or nonlinear function;

Assumption A.(ii). The noise process $\{V_i: i=0, \ldots, n\}$ satisfies $$P_{V_i|V^{i-1}, A^i, Y^{-1}}(dv_i | v^{i-1}, a^i, y^{-1}) = P_{V_i}(dv_i), i=0, \ldots, n.$$

Hence, a G-RCM induces a sequence of control system conditional distributions, and these are not necessarily Gaussian.

F. The analogy between feedback capacity of noisy communication channels and stochastic optimal control problems, with directed information pay-off, introduced in A.-D., and depicted in FIG. 1, states that randomized strategies called randomized control strategies can be used to control the control system and to encode information signals or messages, and communicate the information signals over the control system, which acts as a communication channel, to any of the other processes attached to the control system, and reconstruct the information signals by using a decoder or estimator.

Hierarchical Decomposition: Cost of Control and Communication

For any finite n, $C_{0,n}(\kappa) \triangleq J_{A^n \to Y^n}(P^*, \kappa)$ is a concave non-decreasing in $\kappa \in [0, \infty)$, and the inverse function of $C_{0,n}(\kappa)$ denoted by $\kappa_{0,n}(C)$ is a convex non-decreasing function of $C \in [0, \infty)$. This implies $$\kappa_{0,n}(C) \triangleq \inf_{P_{A_i|A^{i-1}, Y^{i-1}}, i=0, \ldots, n: \frac{1}{n+1} I(A^n \to Y^n) \geq C} E\{\ell_{0,n}(A^n, Y^n)\}$$

$$\geq \inf_{P_{A_i|A^{i-1}, Y^{i-1}}, i=0, \ldots, n} E\{\ell_{0,n}(A^n, Y^n)\} \equiv \kappa_{0,n}(0).$$

Clearly, $\kappa_{0,n}(0) \equiv \kappa_{min}$ is the optimal pay-off or cost of the control system without communication. Then $\kappa_{0,n}(C) - \kappa_{0,n}(0)$ is the additional cost incurred if the control system operates at an information rate of at least C.

The cost of communication is given by $$\kappa(C) - \kappa(0) \triangleq \lim_{n \to \infty} \frac{1}{n+1} \kappa_{0,n}(C) - \lim_{n \to \infty} \frac{1}{n+1} \kappa_{0,n}(0).$$

In general, $\kappa(C) - \kappa(0) > 0$. In view of the above connections, $\kappa_{0,n}(\kappa)$ decomposes into two sub-problems, the optimal control sub-problem and the optimal communication sub-problem, which imposes a natural hierarchical decomposition on any optimization problem $C_{0,n}(\kappa)$.

In addition, we show that classical stochastic optimal control problems, defined by $$J_{0,n}(P^*) \triangleq \inf_{\mathcal{P}_{[0,n]}} E\{\ell_{0,n}(A^n, Y^n)\}.$$

are degenerate optimization problems of the FTH information CC-Capacity ( ).

There are several hidden aspects of the FTH information CC-Capacity $J_{A^n \to Y^n}(P^*, \kappa)$, which include the following.

i) Randomized Versus Deterministic Strategies.

Randomized strategies $\mathcal{P}_{[0,n]}$ incur a higher value for the pay-off $I(A^n \to Y^n)$ than deterministic strategies, $\mathcal{P}_{[0,n]}^D$, that is, when $\{P_i(da_i|a^{i-1}, y^{i-1}): i=0, \ldots, n\} \in \mathcal{P}_{[0,n]}$ are delta measures concentrated at $$a_j^g = g_j(y^{g,-1}, y_0^g, \ldots, y_{j-1}^g, a_0^g, a_1^g, \ldots, a_{j-1}^g)$$

for $j=0, \ldots, n$. Indeed, if randomized control strategies $\mathcal{P}_{[0,n]}$ are replaced by deterministic strategies then $$I(A^n \to Y^n) = 0, \forall \{P_i(\cdot|\cdot): i=0, \ldots, n\} \in \mathcal{P}_{[0,n]}^D.$$

This implies that that for any directed information pay-off, and hence for the FTH information CC-Capacity, randomized control strategies are responsible for encoding of information signals, into the control process {$A_i: i=0, \ldots, n$}, which cosists of a deterministic control strategy part and a random encoder strategy part. This is fundamentally different from classical stochastic optimal control problems $J_{0,n}(P^*)$, in which the performance over randomized and deterministic control strategies is the same.

ii) Duality Relations.

The inverse of the function $C_{0,n}(\kappa) \triangleq J_{A^n \to Y^n}(P^*, \kappa)$ denoted by is given by the following optimization problem.

Dual Extremum Problem 1.

$$\kappa_{0,n}(C) \triangleq \inf_{P_i(da_i | a^{i-1}, y^{i-1}), i=0,\ldots,n: \frac{1}{n+1}I(A^n \to Y^n) \geq C} \{E(\ell_{0,n}(A^n, Y^n))\}$$

$$\geq \kappa_{0,n}(0) \equiv J_{0,n}(P^*).$$

The inequality states that it costs more to simultaneously control and transmit information than to control only. The additional cost to communicate is $\kappa_{0,n}(C) - \kappa_{0,n}(0)$; this is quantified in the application examples.

Moreover, if the randomized control strategies $\mathcal{P}_{[0,n]}$ are restricted to deterministic strategies $\mathcal{P}_{[0,n]}^D$, then and necessarily C=0. The resulting optimization problem reduces to the following classical stochastic optimal control problem (without an information theoretic constraint).

Degenerate Dual Extremum Problem 2.

$$\kappa_{0,n}(C) = \inf_{\mathcal{P}_{[0,n]}^D} E\{\ell_{0,n}(A^n, Y^n)\} \text{ if } \mathcal{P}_{[0,n]} = \mathcal{P}_{[0,n]}^D$$

$$= \kappa_{0,n}(0).$$

The last equality follows from fact that randomized control strategies do not incur better performance.

The application example in [0037] illustrates the above statements.

Characterization of Control-Coding Capacity of Dynamical Systems

G. Consider an example control system with control system distribution, and cost function defined by $$Q_i(dy_i | y^{i-1}, a_{i-L}^i), \gamma_i(a_{i-N}^i, y^{i-1}), i=0, \ldots, n \quad (0.1)$$

where $a_{i-L}^i \triangleq (a_{i-L}, a_{i-L+1}, \ldots, a^i)$, $y^{i-1} = (y^{-1}, y_0, \ldots, y_{i-1})$, {L, N} are a finite non-negative integers, with an average constraint defined by $$\mathcal{P}_{[0,n]}^N(\kappa) \triangleq$$

$$\left\{ P_i(da_i | a^{i-1}, y^{i-1}), i = 0, \ldots, n: \frac{1}{n+1} E\left(\sum_{i=0}^n \gamma_i(A_{i-N}^i, Y^{i-1})\right) \leq \kappa \right\}.$$

Then the characterization of FTH information CC-Capacity is given by $$J_{A^n \to Y^n}^I(\pi^{I,*}, \kappa) \sup_{\mathcal{P}_{[0,n]}^I(\kappa)} \sum_{i=0}^n E\left\{\log\left(\frac{dQ_i(\cdot | Y^{i-1}, A_{i-L}^i)}{d\Pi_i^{\pi^I}(\cdot | Y^{i-1})}(Y_i)\right)\right\}, \quad (.2)$$

$$I \triangleq \max\{L, N\}$$

where the distributions are given by $$\Pi_i^{\pi^I}(dy_i | y^{i-1}) = \quad (.3)$$

$$\int_{A_{i-L}^i} Q_i(dy_i | y^{i-1}, a_{i-L}^i) \otimes \pi_i^I(da_i | a_{i-I}^{i-1}, y^{i-1}) \otimes P^{\pi^I}(da_{i-I}^{i-1} | y^{i-1}),$$

$$P_\mu^{\pi^I}(da^i, dy^i) = \mu(dy^{-1}) \otimes_{i=0}^n (Q_i(dy_i | y^{i-1}, a_{i-L}^i) \otimes \pi_i^I(da_i | a_{i-I}^{i-1}, y^{i-1})), \quad (.4)$$

$$i = 0, \ldots, n.$$

$$\mathcal{P}_{[0,n]}^I(\kappa) \triangleq$$

$$\left\{ \pi_i^I(da_i | a_{i-I}^{i-1}, y^{i-1}), i = 0, \ldots, n: \frac{1}{n+1} E\left(\sum_{i=0}^n \gamma_i(A_{i-N}^i, Y^{i-1})\right) \leq \kappa \right\}$$

H. Consider an example control system with control system distribution, and cost function defined by $$Q_i(dy_i | y_{i-M}^{i-1}, a_{i-L}^i), \gamma_i(a_{i-N}^i, y_{i-K}^{i-1}), i=0, \ldots, n \quad (0.5)$$

where {M,K} are finite non-negative integers and the convention is $y_{i-M}^{i-1}|_{M=0} = \{\emptyset\}$ for any i. Then the characterization of FTH information CC-Capacity is given by $$J_{A^n \to Y^n}^{I,M}(\pi^{I,*}, \kappa) = \sup_{\mathcal{P}_{[0,n]}^{I,K}} \sum_{i=0}^n E\left\{\log\left(\frac{dQ_i(\cdot | Y_{i-M}^{i-1}, A_{i-L}^i)}{d\Pi_i^{\pi^I}(\cdot | Y^{i-1})}(Y_i)\right)\right\} \quad (.6)$$

where $$\mathcal{P}_{[0,n]}^{I,K}(\kappa) \triangleq$$

$$\left\{ \pi_i^I(da_i | a_{i-I}^{i-1}, y^{i-1}), i = 0, \ldots, n: \frac{1}{n+1} E\left(\sum_{i=0}^n \gamma_i(A_{i-N}^i, Y_{i-K}^{i-1})\right) \leq \kappa \right\},$$

where $I \triangleq \max\{L, N\}$, and $$\Pi_i^{\pi^I}(dy_i | y^{i-1}) = \quad (.7)$$

$$\int_{\mathbb{A}_{i-L}^i} Q_i(dy_i | y_{i-M}^{i-1}, a_{i-L}^i) \otimes \pi_i^I(da_i | a_{i-I}^{i-1}, y^{i-1}) \otimes P^{\pi^I}(da_{i-I}^{i-1} | y^{i-1})$$

$$P_\mu^{\pi^I}(da^i, dy^i) = \mu(dy^{-1}) \otimes_{j=0}^i \quad (.8)$$

$$(Q_j(dy_j | y_{j-M}^{j-1}, a_{j-L}^j) \otimes \pi_j^I(da_j | a_{j-I}^{j-1}, y^{j-1})), i = 0, \ldots, n.$$

I. Consider an example control system with control system distribution and cost function defined by $$Q_i(dy_i | y_{i-M}^{i-1}, a_i), \gamma_i(a_i, y_{i-K}^{i-1}), i=0, \ldots, n \quad (0.9)$$

Then the characterization of FTH information CC-Capacity is given by $$J_{A^n \to Y^n}^J(\pi^{0,J,*}, \kappa) = \sup_{\mathcal{P}_{[0,n]}^J(\kappa)} \sum_{i=0}^n E\left\{\log\left(\frac{dQ_i(\cdot | Y_{i-M}^{i-1}, A_i)}{d\Pi_i^{\pi^{0,J}}(\cdot | Y_{i-J}^{i-1})}(B_i)\right)\right\}, \quad (.10)$$

$$J \triangleq \max\{M, K\}$$

where

-continued $$\overset{\circ}{\mathcal{P}}^J_{[0,n]}(\kappa) \triangleq \tag{.11}$$

$$\left\{\pi_{0,J}(da_i \mid y_{i-J}^{i-1}), i = 0, \ldots, n : \frac{1}{n+1} E\left(\sum_{i=0}^n \gamma_i(A_i, Y_{i-k}^{i-1})\right) \leq \kappa\right\}.$$

$$\Pi_i^{0,J}(dy_i \mid y_{i-J}^{i-1}) = \int_{A_i} Q_i(dy_i \mid y_{i-M}^{i-1}, a_i) \otimes \pi_i^{0,J}(da_i \mid y_{i-J}^{i-1}),$$

$$P_\mu^{\pi^{0,J}}(da^i, dy^i) = \mu(dy^{-1}) \otimes_{j=0}^i (Q_j(dy_j \mid y_{j-M}^{j-1}, a_j) \otimes \pi_j^{0,J}(da_j \mid y_{j-J}^{j-1})).$$

The above characterization means the joint process $\{(A_i, Y_i) : i=0, \ldots, n\}$ and the output process $\{Y_i : i=0, \ldots, n\}$ are J-order Markov process.

J. The characterizations of FTH information CC-Capacity are general and hence, they hold for arbitrary control models, noise distributions, and cost functions.

CC-Capacity of Gaussian-G-RCM-1 and Randomized Strategies

K. Consider an example G-RCM of E. called Gaussian-G-RCM-1 with quadratic cost function defined as follows.

$$Y_i = C^{i-1} Y^{i-1} + D_{i,i} A_i + D_{i,i-1} A_{i-1} + V_i,$$

$$Y^{-1} = y^{-1}, A_{-1} = a_{-1}, i = 0, \ldots, n,$$

$$P_{V_i | Y^{i-1}, A^i, Y^{-1}} = P_{V_i}, V_i \sim N(0, K_{V_i}), K_{V_i} \succ 0,$$

$$(Y^{-1}, A_{-1}) \sim N(0, K_{Y^{-1}, A_{-1}}), K_{Y^{-1}, A_{-1}} \succ 0,$$

$$\gamma_i(\alpha_i, y_{i-1}) \triangleq \langle a_i, R_i a_i \rangle + \langle y_{i-1}, Q_{i,i-1} y_{i-1} \rangle,$$

$$(D_{i,i}, D_{i,i-1}) \in \mathbb{R}^{p \times q} \times \mathbb{R}^{p \times q},$$

$$R_i \in \mathbb{S}_{++}^{q \times q}, Q_{i,i-1} \in \mathbb{S}_{+}^{p \times p}, i = 0, \ldots, n.$$

where $\mathbb{S}_+^{q \times q}$ denotes the set of positive semidefinite q×q matrices, and $\mathbb{S}_{++}^{q \times q}$ their restriction to positive definite, and $\langle \cdot, \cdot \rangle$ denotes inner product. The Gaussian-RCM-1 is a Multiple Input Multiple Output (MIMO) control system with memory on past inputs and outputs, is an Infinite Impulse Response (IIR) model, and the cost function is quadratic.

Next, we prepare to compute
(i) the optimal randomized strategy, and
(ii) the FTH CC-Capacity.

From G. the optimal randomized strategy is of the form $\{\pi_i^L(da_i | a_{i-L}^{i-1}, y^{i-1}) = \pi_i^1(da_i | a_{i-1}, y^{i-1}) : i=0, \ldots, n\}$, i.e., L=1. The directed information pay-off is expressed as follows.

$$I(A^n \to Y^n) = \sum_{i=0}^n \{H(Y_i | Y^{i-1}) - H(Y_i | A_{i-1}^i, Y^{i-1})\},$$

$$H(Y_i | Y^{i-1}, A_{i-1}^i) = H(V_i) = \frac{1}{2} \log(2\pi e)^p |K_{V_i}|.$$

Let $\{(A_i^g, Y_i^g, Z_i^g) : i=0, \ldots, n\}$ denote a jointly Gaussian process. By the maximum entropy property of Gaussian distributions it follows that $$\sum_{i=0}^n H(Y_i | Y^{i-1}) = H(Y^n) \leq H(Y^{g,n})$$

and the upper bound is achieved if $\{(A_i, Y_i, Z_i) = (A_i^g, Y_i^g, Z_i^g) : i=0, \ldots, n\}$ and the average constraint is satisfied. Hence, the upper bound is achieved, if the optimal strategies are linear, given as follows.

Randomized Strategy $$A_i^g = U_i^g + \Lambda_{i,i-1} A_{i-1}^g + Z_i^g,$$

$$U_i^g \triangleq \Gamma^{i-1} Y^{g,i-1}, \equiv g_i^1(Y^{g,i-1}) + \Lambda_{i,i-1} A_{i-1}^g + Z_i^g,$$

$$g_i^1(y^{i-1}) \triangleq \Gamma^{i-1} y^{i-1}, i = 0, \ldots, n,$$

$Z_i^g$ is independent of $(A^{g,i-1}, Y^{g,i-1})$, $Z^{g,i}$ is independent of $V^i$, $i=0, \ldots, n$, $\{Z_i^g \sim N(0, K_{Z_i}) : i=0, 1, \ldots, n\}$ is an independent Gaussian process for some deterministic matrices $\{(\Gamma^{i-1}, \Lambda_{i,i-1}) : i=0, \ldots, n\}$ of appropriate dimensions.

Next, we prepare to compute the directed information pay-off. To this end, we need to compute the conditional entropy $H(Y_i^g | Y^{g,i-1})$, $i=0, \ldots n$, which means we need to determine the conditional density of $Y_i^g$ given $Y^{g,i-1}$ for $i=0, \ldots, n$, using the stochastic control system and strategy. Since the conditional density is characterized by the conditional mean and covariance, we define the quantities $$\hat{Y}_{i|i-1} \triangleq E^{e^1}\{Y_i^g | Y^{g,i-1}\}, \hat{A}_{i|i} \triangleq E^{e^1}\{A_i^g | Y^{g,i}\},$$

$$K_{Y_i | Y^{i-1}} \triangleq E^{e^1}\{(Y_i^g - \hat{Y}_{i|i-1})(Y_i^g - \hat{Y}_{i|i-1})^T | Y^{g,i-1}\}$$

$$P_{i|i} = E^{e^1}(A_i^g - \hat{A}_{i|i})(A_i^g - \hat{A}_{i|i})^T, i=0, \ldots, n.$$

From above and using the independent properties of the noise process then $$\hat{A}_{i|i} = \Lambda_{i,i-1} \hat{A}_{i-1|i-1} + U_i^g + \Delta_{i|i-1}(Y_i^g - \hat{Y}_{i|i-1}),$$

$$\hat{Y}_{i|i-1} = C^{i-1} Y^{g,i-1} + D_{i,i} U_i^g + \overline{\Lambda}_{i,i-1} \hat{A}_{i-1|i-1},$$

$$K_{Y_i | Y^{i-1}} = \overline{\Lambda}_{i,i-1} P_{i-1|i-1} \overline{\Lambda}_{i,i-1}^T + D_{i,i} K_{Z_i} D_{i,i}^T + K_{V_i}, i=0, \ldots, n.$$

where $(\hat{A}_{-1|-1}, P_{-1|-1})$ are initial data and $$\overline{\Lambda}_{i,i-1} \triangleq D_{i,i} \Lambda_{i,i-1} + D_{i,i-1}, i=0, \ldots, n,$$

$$P_{i|i} = \Lambda_{i,i-1} P_{i-1|i-1} \Lambda_{i,i-1}^T + K_{Z_i} - (K_Z D_{i,i}^T + \Lambda_{i,i-1} P_{i-1|i-1} \overline{\Lambda}_{i,i-1}^T) \cdot \Phi_{i|i-1} (K_Z D_{i,i}^T + \Lambda_{i,i-1} P_{i-1|i-1} \overline{\Lambda}_{i,i-1}^T)^T,$$

$$\Phi_{i|i-1} \triangleq [D_{i,i} K_{Z_i} D_{i,i}^T + K_{V_i} + \overline{\Lambda}_{i,i-1} P_{i-1|i-1} \overline{\Lambda}_{i,i-1}^T]^{-1},$$

$$\Delta_{i|i-1} \triangleq (K_Z D_{i,i}^T + \Lambda_{i,i-1} P_{i-1|i-1} \overline{\Lambda}_{i,i-1}^T) \Phi_{i|i-1}$$

The innovations process denoted by $\{v^{e^1} : i=0, \ldots, n\}$ is an orthogonal process, independent of $\{g_i^1(\cdot) : i=0, \ldots, n\}$, and satisfies the following identities.

$$v_i^{e^1} \triangleq Y_i^g - \hat{Y}_{i|i-1} = \overline{\Lambda}_{i,i-1}(A_{i-1}^g - \hat{A}_{i-1|i-1}) + D_{i,i} Z_i^g + V_i = v_i^{e^1}|_{g^1=0} \equiv v_i^0, v_i^0 \sim N(0, K_{Y_i | Y^{i-1}}), i=0, \ldots, n$$

where $\{v_i^0 : i=0, \ldots, n\}$ indicates that the innovations process is independent of the strategy $\{g_i^1(\cdot) : i=0, \ldots, n\}$. From the above equations, since the conditional covariance $K_{Y_i | Y^{i-1}}$ is independent of $Y^{g,i-1}$ for $i=0, \ldots, n$, the conditional distribution is $P^{e^1}(Y_i^g \leq y_i | Y^{g,i-1}) \sim N(\hat{Y}_{i|i-1}, K_{Y_i | Y^{i-1}})$, $i=0, \ldots, n$. Applying the above two observations we obtain $$I(A^{g,n} \to Y^{g,n}) = \frac{1}{2} \sum_{i=0}^n \log \frac{|K_{Y_i | Y^{i-1}}|}{|K_{V_i}|} \equiv \sum_{i=0}^n \{H(v_i^0) - H(V_i)\}$$

Next, we give the closed form expressions of the optimal randomized control strategies, and the FTH CC-Capacity.

CC-Capacity and Randomized Strategy

Consider the Gaussian-RCM-1. The following hold.

(a) FTH Information CC-Capacity.

The joint process $\{(A_i,Y_i)=(A_i^g,Y_i^g):i=0,\ldots,n\}$, is jointly Gaussian and satisfies the following equations.

$$A_i^g = e_i^1(Y^{g,i-1}, A_{i-1}^g) + Z_i^g, i = 0, \ldots, n,$$
$$= U_i^g + \Lambda_{i,i-1} A_{i-1}^g + Z_i^g,$$
$$U_i^g = g_i^1(Y^{g,i-1}) = \Gamma^{i-1} Y^{g,i-1},$$
$$Y_i^g = C^{i-1} Y^{g,i-1} + \overline{\Lambda}_{i,i-1} A_{i-1}^g + D_{i,i} U_i^g + D_{i,i} Z_i^g + V_i,$$

i) $Z_i^g$ is independent of $(A^{g,i-1}, Y^{g,i-1})$, i=0, ..., n,
ii) $Z^{g,i}$ is independent of $V^i$, i=0, ..., n,
iii) $\{Z_i^g \sim N(0, K_{Z_i}):i=0, 1, \ldots, n\}$ is an independent Gaussian process, $$E^{e^1}\{\gamma_i(A_i^g, Y_i^g)\} = E^{e^1}\{\langle U_i^g, R_i U_i^g \rangle + 2\rangle \Lambda_{i,i-1} \hat{A}_{i-1|i-1},$$
$$R_i U_i^g\rangle + \langle \Lambda_{i,i-1} \hat{A}_{i-1|i-1}, R_i \Lambda_{i,i-1} \hat{A}_{i-1|i-1}\rangle + tr$$
$$(K_{Z_i} R_i) + tr(\Lambda_{i,i-1}^T R_i \Lambda_{i,i-1} P_{i-1|i-1}) + \langle Y_{i-1}^g,$$
$$Q_i Y_{i-1}^g\rangle\}.$$

The FTH CC-Capacity given by $$J_{A^n \to Y^n}^1(e^{1,*}) = \sup_{\mathcal{P}_{[0,n]}^1(\kappa)} \frac{1}{2} \sum_{i=0}^n \log \frac{|K_{Y_i|Y^{i-1}}|}{|K_{V_i}|}$$

and the average constraint set is defined by $$\mathcal{P}_{[0,n]}^1(\kappa) \triangleq \left\{ e_i^1(\cdot) \triangleq (g_i^1(\cdot, \cdot), \Lambda_{i,i-1}, K_{Z_i}), \right.$$
$$\left. i = 0, \ldots, n: \frac{1}{n+1} \sum_{i=0}^n E^{e^1}(\gamma_i(A_i^g, Y^{g,i-1})) \leq \kappa \right\}.$$

(b) Decentralized Separation of Randomized Strategy into Controller and Encoder.

The optimal strategy denoted by $\{e^{1,*}(\cdot) \equiv (g_i^{1,*}(\cdot), \Lambda_{i,i-1}^*, K_{Z_i}^*):i=0,\ldots,n\}$ is the solution of the dual optimization problem $$\kappa_{0,n}(C) \triangleq$$
$$\inf_{(g_i^1(\cdot), \Lambda_{i,i-1}, K_{Z_i}):i=0,\ldots,n: \frac{1}{2}\sum_{i=0}^n \log \frac{|K_{Y_i|Y^{i-1}}|}{|K_{V_i}|} \geq (n+1)C} E^{e^1}\left\{\sum_{i=0}^n \gamma_i(A_i^g, Y_{i-1}^g)\right\}.$$

Moreover, the following decentralized separation holds.

(i) The optimal strategy $\{g_i^{1,*}(\cdot):i=0,\ldots,n\}$ is the solution of the optimization problem $$\inf_{g_i^1(\cdot):\, i=0,\ldots,n} E^{e^1}\left\{\sum_{i=0}^n \gamma_i(A_i^g, Y_{i-1}^g)\right\}$$

for a fixed $\{\Lambda_{i,i-1}, K_{Z_i}:i=0,\ldots,n\}$.

(ii) The optimal strategy $\{\Lambda_{i,i-1}^*, K_{Z_i}^*:i=0,\ldots,n\}$ is the solution of $\kappa_{0,n}(C)$ for $\{g_i^1(\cdot)=g_i^{1,*}(\cdot):i=0,\ldots,n\}$ determined from (i).

(c) Optimal Strategies of Controller and Encoder.

Suppose in (a), $Y_i^g$ is replaced by $$Y_i^g = C_{i,i-1} Y_{i-1}^g + \overline{\Lambda}_{i,i-1} A_{i-1}^g + D_{i,i} U_i^g + D_{i,i} Z_i^g + D_{i,i} Z_i^g + V_i, i=0,\ldots,n.$$

Any candidate of the control strategy $\{g_i^1(Y^{g,i-1}):i=0,\ldots,n\}$ is of the form $$g_i^1(Y^{g,i-1}) \triangleq \Gamma_{i,i-1}^1 Y_{i-1}^g + \Gamma_{i,i-1}^2 \hat{A}_{i-1|i-1},$$
$$\equiv \Gamma_{i,i-1} \overline{Y}_{i-1}^g, \overline{Y}_{i-1}^g \triangleq \begin{bmatrix} Y_{i-1}^g \\ \hat{A}_{i-1|i-1} \end{bmatrix},$$

$i = 0, \ldots, n.$

Define the augmented system $$\overline{Y}_i^g = \overline{F}_{i,i-1} \overline{Y}_{i-1}^g + \overline{B}_{i,i-1} U_i^g + \overline{G}_{i,i-1} v_i^{e^1},$$
$$\overline{F}_{i,i-1} \triangleq \begin{bmatrix} C_{i,i-1} & \overline{\Lambda}_{i,i-1} \\ 0 & \Lambda_{i,i-1} \end{bmatrix}, \overline{B}_{i,i-1} \triangleq \begin{bmatrix} D_{i,i} \\ I \end{bmatrix}, \overline{G}_{i,i-1} \triangleq \begin{bmatrix} I \\ \Delta_{i|i-1} \end{bmatrix},$$

$i = 0, \ldots, n$ and average cost $$E^{e^1}\left\{\sum_{i=0}^n \gamma_i(A_i^g, Y_{i-1}^g)\right\} \equiv E^{e^1}\left\{\sum_{i=0}^n \overline{\gamma}_i(U_i^g, \overline{Y}_{i-1}^g)\right\}$$
$$\triangleq E^{e^1}\left\{\sum_{i=0}^n \left(\begin{bmatrix}\overline{Y}_{i-1}^g \\ U_i^g\end{bmatrix}^T \begin{bmatrix}\overline{M}_{i,i-1} & \overline{L}_{i,i-1} \\ \overline{L}_{i,i-1}^T & \overline{N}_{i,i-1}\end{bmatrix} \begin{bmatrix}\overline{Y}_{i-1}^g \\ U_i^g\end{bmatrix}\right.\right.$$
$$\left.\left.+ tr(K_Z, R_i) + tr(\Lambda_{i,i-1}^T R_i \Lambda_{i,i-1} P_{i-1|i-1})\right)\right\}.$$

$$\overline{M}_{i,i-1} \triangleq \begin{bmatrix} Q_{i,i-1} & 0 \\ 0 & \Lambda_{i,i-1}^T R_i \Lambda_{i,i-1} \end{bmatrix},$$
$$\overline{L}_{i,i-1} \triangleq \begin{bmatrix} 0 \\ \Lambda_{i,i-1}^T R_i \end{bmatrix}, \overline{N}_{i,i-1} \triangleq R_i.$$

Then the following hold.

(1) For a fixed $\{\Lambda_{i,i-1}, K_{Z_i}:i=0,\ldots,n\}$ the optimal strategy $\{U_i^{g,*}=g_i^{1,*}(Y^{g,i-1}):i=0,\ldots,n\}$ is the solution of the partially observable classical stochastic optimal control problem $$J_{0,n}(g^{1,*}(\cdot), \Lambda, K_Z) \triangleq \inf_{g_i^1(\cdot):i=0,\ldots,n} E^{e^1}\left\{\sum_{i=0}^n \overline{\gamma}_i(U_i^g, \overline{Y}_{i-1}^g)\right\}$$

where $\{\overline{Y}_i^g:i=0,\ldots,n\}$ satisfy the above recursion. Moreover, the optimal strategy $\{U_i^{g,*}=g_i^{1,*}(Y^{g,i-1})\equiv g_i^{1,*}(\overline{Y}^{g,i-1}):i=0,\ldots,n\}$ is given by the following equations.

$$g_i^{1,*}(\overline{y}^{i-1}) = \overline{\Gamma}_{i,i-1} \overline{y}^{i-1}, i=0,\ldots,n-1,$$
$$= -(\overline{N}_{i,i-1} + \overline{B}_{i,i-1}^T \Sigma(i+1) \overline{B}_{i,i-1})^{-1} \overline{B}_{i,i-1}^T \Sigma(i+1) \overline{F}_{i,i-1} \overline{y}^{i-1},$$
$$g_n^{1,*}(\overline{y}^{n-1}) = 0,$$

where the symmetric positive semidefinite matrix $\{\Sigma(i): i=0, \ldots, n\}$ satisfies a matrix difference Riccati equation, for $i=0, \ldots, n-1$, equation $$\Sigma(i) = \overline{F}_{i,i-1}^T \Sigma(i+1) \overline{F}_{i,i-1} - (\overline{F}_{i,i-1}^T \Sigma(i+1) \overline{B}_{i,i-1} + \overline{L}_{i,i-1}) \cdot (\overline{N}_{i,i-1} + \overline{B}_{i,i-1}^T \Sigma(i+1) \overline{B}_{i,i-1})^{-1} (\overline{B}_{i,i-1}^T \Sigma_{i,i-1} \overline{F}_{i,i-1} + \overline{L}_{i,i-1}^T) + \overline{M}_{i,i-1}, \Sigma(n) = \overline{M}_{n,n-1}$$

and the optimal pay-off is given by $$J_{0,n}(g^{1,*}(\cdot), \Lambda, K_Z) = \sum_{j=0}^{n} \left\{ tr\left(\Phi_{j|j-1} \sum(j)\right) + tr(K_{Z_j} R_j) + tr(\Lambda_{j,j-1}^T R_j \Lambda_{j,j-1} P_{j-1|j-1}) + tr\left(\Delta_{j|j-1} K_{Y_j|Y^{j-1}} \Delta_{j,j-1} \sum(j)\right) \right\} + \langle \overline{Y}_{-1|-1}, \sum(0) \overline{Y}_{-1|-1} \rangle.$$

(2) The optimal strategies $\{(\Lambda_{i,i-1}^*, K_{Z_i}^*): i=0, \ldots, n\}$ are the solutions of the optimization problem $$\kappa_{0,n}(C) \triangleq \inf_{\substack{(\Lambda_{i,i-1}, K_{Z_i}), i=0,\ldots,n: \frac{1}{2} \sum_{i=0}^{n} \log \left|\frac{K_{Y_i|Y^{i-1}}}{K_{V_i}}\right| \geq (n+1)C}} \{J_{0,n}(g^{1,*}(\cdot), \Lambda, K_Z)\}.$$

The above is a decentralized separation principle, and (1) and (2) are Person-by-Person Optimality statements of $\{g_i^1(\cdot): i=0, \ldots,\}$ and $\{\Lambda_{i,i-1}, K_{Z_i}: i=0, \ldots, n\}$.

CC-Capacity of Gaussian-G-RCM-2 and Randomized Strategies

L. Consider an example G-RCM of H. called Gaussian-G-RCM-2 with quadratic cost function defined as follows.

$$Y_i = C_{i,i-1} Y_{i-1} + D_i A_i + V_i, Y_{-1} = y_{-1},$$

$$P_{V_i|V^{i-1}, A^i, Y^{i-1}} = P_{V_i}, V_i \sim N(0, K_{V_i}), K_{V_i} \succ 0,$$

$$\gamma_i(a_i, y_{i-1}) \triangleq \langle a_i, R_i a_i \rangle + \langle y_{i-1}, Q_{i,i-1} y_{i-1} \rangle.$$

By I. the characterization if FTH-DI information CC-Capacity is $$J_{A^n \to Y^n}(\pi^*, \kappa) = \sup_{\overset{\circ}{\mathcal{P}}_{[0,n]}(\kappa)} \sum_{i=0}^{n} \int \log\left(\frac{dQ_i(\cdot|y_{i-1}, \alpha_i)}{d\prod_i^{\pi}(\cdot|y_{i-1})}\right)(y_i) P^\pi(dy_i, y_{i-1}, da_i)$$

$$\equiv \sup_{\overset{\circ}{\mathcal{P}}_{[0,n]}(\kappa)} \sum_{i=0}^{n} I(A_i; Y_i | Y_{i-1})$$

$$\prod_i^\pi (dy_i | y_{i-1}) = \int_{\mathbb{A}_i} Q_i(dy_i | y_{i-1}, a_i) \otimes \pi_i(da_i | y_{i-1})$$

$$\overset{\circ}{\mathcal{P}}_{[0,n]}(\kappa) \triangleq \left\{ \pi_i(da_i | y_{i-1}), i=0, \ldots, \right.$$

$$\left. n: \frac{1}{n+1} \sum_{i=0}^{n} E^\pi\{\langle A_i, R_i A_i \rangle + \langle Y_{i-1}, Q_{i,i-1} Y_{i-1} \rangle\} \leq \kappa \right\}$$

The optimal randomized strategy of above characterization of FTH information CC-Capacity is now computed, using several steps.

(a) Gaussian Properties of Characterization of FTH Information CC-Capacity.

Using dynamic programming or the maximum entropy property of processes with fixed second moments, the optimal strategies are Gaussian denoted by $\{\pi_i^g(da_i | y_{i-1}):$ $i=0, \ldots, n\} \in \overset{\circ}{\mathcal{P}}_{[0,n]}(\kappa)$, and the joint process is jointly Gaussian denoted by $\{(A_i, Y_i) \equiv (A_i^g, Y_i^g): i=0, \ldots, n\}$.

(h) Realization of Optimal Strategies.

Since $\{(A_i^g, Y_i^g): i=0, \ldots, n\}$ is jointly Gaussian, strategies from the set $\overset{\circ}{\mathcal{P}}_{[0,n]}(\kappa)$, can be realized by linear and Gaussian randomized strategies defined by the set $$\mathcal{P}_{[0,n]}(\kappa) \triangleq \{A_i^g = e_i(Y_{i-1}^g, Z_i^g),$$

$$e_i(Y_{i-1}^g, Z_i^g) \triangleq g_i(Y_{i-1}^g) + Z_i^g = \Gamma_{i,i-1} Y_{i-1}^g + Z_i^g,$$

$$Z_i^g \perp Y^{g,i-1}, \{Z_i^g: i=0, \ldots, n\}$$

independent process, $$Z_i^g \sim N(0, K_{Z_i}), K_{Z_i} \in \mathbb{S}_+^{q \times q}, i=0, \ldots, n:$$

$$\frac{1}{n+1} E^e \left\{ \sum_{i=0}^{n} [\langle A_i^g, R_i A_i^g \rangle + \langle Y_{i-1}^g, Q_{i,i-1} Y_{i-1}^g \rangle] \right\} \leq \kappa \right\}$$

where $\cdot \perp \cdot$ means the processes are independent.

Moreover, the characterization of the FTH information CC-Capacity is $$J_{A^n \to Y^n}(\pi^{g,*}, \kappa) = \sup_{\{(\Gamma_{i,i-1}, Z_i^g), i=0,\ldots,n\} \in \mathcal{P}_{[0,n]}(\kappa)} \left\{ \frac{1}{2} \sum_{i=0}^{n} \ln \frac{|D_i K_{Z_i} D_i^T + K_{V_i}|}{|K_{V_i}|} \right\}.$$

(c) Dual Role of Randomized Control Strategies.

Since the optimal control strategies admit the decomposition $$A_i^g = \Gamma_{i,i-1} Y_{i-1}^g + Z_i^g \equiv g_i(Y_{i-1}^g) + Z_i^g, i=0, \ldots, n$$

then we have the following: (i) the feedback control law or strategy $\{g_i \equiv \Gamma_{i,i-1}: i=0, \ldots, n\}$ is responsible for controlling the output process $\{Y_i^g: i=0, \ldots, n\}$, and (ii) the orthogonal innovations process $\{Z_i^g: i=0, \ldots, n\}$ is responsible for communicating new information to the output process, both chosen to maximize $J_{A^n \to Y^n}(\pi^{g,*}, \kappa)$.

(d) Decentralize Separation Principle of Optimal Randomized Strategies.

Let $\{(A_i^{g,*}, Y_i^{g,*}, Z_i^{g,*}): i=0, \ldots, n\}$ denote the optimal joint process corresponding to (c) above. The cost-to-go $C_i: \mathbb{Y}_{i-1} \longmapsto \mathbb{R}$ (corresponding to $J_{A^n \to Y^n}(\pi^{g,*}, \kappa)$), from time "i" to terminal time "n" satisfies the dynamic programming recursions $$C_n(y_{n-1}) = \sup_{(u_n, K_{Z_n}) \in \mathbb{R}^q \times \mathbb{S}_+^{q \times q}} \left\{ \frac{1}{2} \log \frac{|D_n K_{Z_n} D_n^T + K_{V_n}|}{|K_{V_n}|} - s \, tr(R_n K_{Z_n}) - s[\langle u_n, R_n u_n \rangle + \langle y_{n-1}, Q_{n,n-1} y_{n-1} \rangle] + s(n+1)\kappa \right\},$$

$$C_i(y_{i-1}) = \sup_{(u_i, K_{Z_i}) \in \mathbb{R}^q \times \mathbb{S}_+^{q \times q}} \left\{ \frac{1}{2} \log \frac{|D_i K_{Z_i} D_i^T + K_{V_i}|}{|K_{V_i}|} - \right.$$

-continued $$s\,tr(R_i K_{Z_i}) - s[\langle u_i, R_i u_i \rangle + \langle y_{i-1}, Q_{i,i-1} y_{i-1} \rangle] +$$
$$E\{C_{i+1}(Y_i^{g,*}) \mid Y_{i-1}^{g,*} = y_{i-1}\}\Big\}, i = 0, \ldots, n-1$$

where $s \geq 0$ is the Lagrange multiplier associated with the average constraint. The solution of the dynamic programming equations is given by the following equations.

$$C_i(y_{i-1}) = \{-s\langle y_{i-1}, P(i) y_{i-1} \rangle + r(i)\}, i = 0, \ldots, n$$

where $\{r(i): i = 0, \ldots, n-1\}$ satisfies the recursions $$r(i) = r(i+1) + \sup_{K_{Z_i} \in S_+^{q \times q}} \left\{ \frac{1}{2} \log \frac{|D_i K_{Z_i} D_i^T + K_{V_i}|}{|K_{V_i}|} - \right.$$
$$\left. s\,tr(P(i+1)[D_{i,i} K_{Z_i} D_i^T + K_{V_i}]) - s\,tr(R_i K_{Z_i}) \right\}$$

$$r(n) = \sup_{K_{Z_n} \in S_+^{q \times q}} \left( \frac{1}{2} \log \frac{|D_n K_{Z_n} D_n^T + K_{V_n}|}{|K_{V_n}|} - s\,tr(R_n K_{Z_n}) + s(n+1)k \right\}$$

and $\{P(i): i = 0, \ldots, n\}$ is a solution of the Riccati difference matrix equation $$P(i) = C_{i,i-1}^T P(i+1) C_{i,i-1} + Q_{i,i-1} - C_{i,i-1}^T P(i+1) D_i (D_{i,i}^T P(i+1) D_i + R_{i,i})^{-1} (C_{i,i-1}^T P(i+1) D_i)^T, i = 0, \ldots, n-1,$$

$$P(n) = Q_{n,n-1}.$$

The optimal randomized control strategy is given by $$A_i^{g,*} = g_i^*(Y_{i-1}^{g,*}) + Z_i^{g,*}, i = 0, \ldots, n$$

where its random part $\{Z_i^{g,*}: i=0, \ldots, n\}$ is the solution to the above recursions, and its deterministic part is given by $$g_i^*(y_{i-1}) = -(D_i^T P(i+1) D_i + R_i)^{-1} D_i^T P(i+1) C_{i,i-1} y_{i-1}$$
$$\equiv \Gamma_{i,i-1}^* y_{i-1}, i = 0, \ldots, n-1,$$
$$g_n^*(y_{n-1}) = 0.$$

The corresponding covariance $K_{Y_i} \triangleq E\{Y_i^g(Y_i^g)^T\}$, $i=0, 1, \ldots, n$, is given by the following equation.

$$K_{Y_i} = (C_{i,i-1} + D_i \Gamma_{i,i-1}^*) K_{Y_{i-1}} (C_{i,i-1} + D_i \Gamma_{i,i-1}^*)^T + D_i K_{Z_i} D_i^T + K_{V_i},$$

$$i = 0, \ldots, n, K_{Y_{-1}} = \text{given}.$$

The Lagrange multiplier $s \geq 0$ are found from the problem $$\inf_{s \geq 0} \{-s\langle y_{-1}, P(0) y_{-1} \rangle + r(0)\}$$

The characterization of the FTH-DI extremum problem is given by $$J_{A^n \to Y^n}(\pi^{g,*}, \kappa) = -s \int_{Y_{-1}} \langle y_{-1}, P(0) y_{-1} \rangle P_{Y_{-1}}(dy_{-1}) + r(0).$$

where $s$ is the value found above.

(e) Water-Filling Solution of Encoder Part of Randomized Strategy.

The above solution illustrates the decentralized separation between the computation of the optimal deterministic part $\{g_i^*(y_{i-1}): i=0, \ldots, n\}$ and the optimal random part $\{K_{Z_i}^*: i=0, \ldots, n\}$ (covariance of innovations process) of the randomized control strategy, the later is found from a sequential water filling problem of recursions $r_i(\cdot)$ that depends on the solution of the matrix Riccati difference equation. Clearly, optimal randomized control strategies have a dual role; to control the controlled process, precisely as in stochastic optimal control theory, of Gaussian control systems with quadratic pay-off, and to transmit new information via its random part $\{Z_i^g: i=0, \ldots, n\}$. This means, information data are mapped into the optimal innovations process with covariance $\{K_{Z_i}^*: i=0, \ldots, n\}$, and then transmitted over the stochastic system, which acts as a communication channel.

(f) Connection to Stochastic Optimal Control Problem.

From the above solution, we can recover, as a degenerate case, the optimal strategies of Gaussian control problems with quadratic pay-off as follows.

The dual of ( ) is given by $$k_{0,n}(C) \triangleq \inf_{(\Gamma_{i,i-1}, K_{Z_i}), i=0, \ldots, n: \frac{1}{2(n+1)} \sum_{i=0}^n \ln \frac{|D_i K_{Z_i} D_i^T + K_{V_i}|}{|K_{V_i}|} \geq C} \left\{ \sum_{i=0}^n E^g(\langle A_i^g, R_i A_i^g \rangle + \langle Y_{i-1}^g, Q_{i,i-1} Y_{i-1}^g \rangle) \right\}$$

$$= \inf_{A_i^g = g_i(Y_{i-1}^g), i=0, \ldots, n} E^g \left\{ \sum_{i=0}^n (\langle A_i^g, R_i A_i^g \rangle + \langle Y_{i-1}^g, Q_{i,i-1} Y_{i-1}^g \rangle) \right\}, \text{ if } K_{Z_i} = 0, i = 0, \ldots, n.$$

The second identity holds if randomized control strategies are restricted to deterministic strategies. Hence, $$J_{A^n \to Y^n}(\pi^{g,*}, \kappa) = 0 \text{ if } K_{Z_i}^* = 0, i = 0, \ldots, n.$$

and the degenerate optimization problem is the stochastic optimal control of Gaussian control systems with quadratic pay-off.

CC-Capacity: Per Unit Time of FTH Information CC-Capacity

M. Consider the Gaussian-G-RCM-2 of L. Here, we compute the capacity of the control system, i.e., given by the per unit time limit of the FTH information CC-Capacity. Suppose the control system is time-invariant, with $\{C_{i,i-1}=C, D_i=D, K_{V_i}=K_V, R_i=R, i=0, \ldots, n, Q_{i,i-1}=Q, i=0, \ldots, n-1, Q_{n,n-1}=M\}$, and the following conditions hold.

i) the pair (C,D) is stabilizable,
ii) the pair (G,C) is detectable, $Q=G^T G$, $G \in \mathbb{S}_+^{p \times p}$.

Then the CC-Capacity of the control system is per unit time limit of the characterization of FTH information CC-Capacity, given by $$C(\kappa) \equiv J_{A^\infty \to Y^\infty}(\pi^{g,*}, k) \triangleq \lim_{n \to} \frac{1}{n+1} J_{A^n \to Y^n}(\pi^{g,*}, \kappa)$$

$$= J^*(s^*) \triangleq \inf_{s \geq 0} J^*(s)$$

where $$J^*(s) = \sup_{K_Z \in \mathbb{S}_+^{q \times q}} \left\{ \frac{1}{2} \log \frac{|DK_Z D^T + K_V|}{|K_V|} + s\kappa - s\ tr(RK_Z) - s\ tr(P[DK_Z D^T + K_V]) \right\}$$

$$g^{\infty,*}(y) = -(D_T PD + R)^{-1} D^T PC\ y \equiv \Gamma^{\infty,*} y.$$

$$P = C^T PC + Q - C^T PD(D^T PD + R)^{-1}(C^T PD)^T,\ spec(C + D\Gamma^{\infty,*}) \subset \mathbb{D}_o$$

where spec(·) denotes the set of eigenvalues and $\mathbb{D}_o \triangleq \{c \in \mathbb{C} : |c| < 1\}$ is the unit disc of the set of complex numbers $\mathbb{C}$. The Lagrange multiplier $s^*(\kappa)$ can be found from the average constraint $$tr(RK_Z) + tr(P[[DK_Z D^T + K_V]) \leq \kappa.$$

Thus, the predictable part of the optimal randomized control strategy $g^{\infty,*}(y)$ ensures existence of a unique invariant distribution $P_{Y^g}(dy)$ of the optimal output process $\{Y_i^*: i=0, \ldots, n\}$ corresponding to $(g^{\infty,*}(\cdot), K_Z^*)$, i.e., stability of the closed loop system, and hence $C(\kappa)$ is operational, i.e., it is the CC-capacity of the control system.

N. Consider an example Gaussian-G-RCM-2 of L., with parameters p=q=1, R=1, Q=0 and (C,D) arbitrary. For these choices of parameters we have the following.

$$(\Gamma^{\infty,*}, K_Z^*) = \begin{cases} (0, k), & \kappa \in [0, \infty) & \text{if } |C| < 1 \\ \left(-\frac{C^2-1}{CD}, \frac{D^2 k + K_V(1-C^2)}{C^2 D^2}\right), & \kappa \in [k_{min}, \infty),\ k_{min} \triangleq \frac{(C^2-1)K_V}{D^2} & \text{if } |C| > 1 \\ \left(-\frac{C^2-1}{CD}, 0\right), & \kappa \in [0, k_{min}], & \text{if } |C| > 1 \end{cases} \quad (.12)$$

and $$C(k) = \begin{cases} \frac{1}{2} \ln \frac{D^2 k + K_V}{K_V} & \text{if } |C| < 1, i.e., K_Z^* = \kappa \\ \frac{1}{2} \ln \frac{D^2 K_Z^* + K_V}{K_V} & \text{if } |C| > 1, \kappa \in [\kappa_{min}, \infty) \\ 0 & \text{if } |C| > 1, \kappa \in [0, \kappa_{min}]. \end{cases}$$

Clearly, if $|C|<1$, i.e., stable, the deterministic part of the strategy is zero, i.e., $\Gamma^{\infty,*}=0$. The capacity formulae $C(\kappa)$, illustrates that there are multiple regimes, depending on whether the control system is stable, that is, $|C|<1$ or unstable $|C|>1$. Moreover, for unstable control systems $|C|>1$, the optimal pay-off is zero, unless the power level $\kappa$ exceeds the critical level $\kappa_{min}$.

Encoder Design for CC-Capacity of Gaussian-G-RCM-2

O. Consider an Example Gaussian-G-RCM-2 of L.

We illustrate via an example of an information process or tracking process, as shown in FIG. 1, how to design the encoder.

Consider a Gaussian information process $\{X_i: i=0, 1, \ldots, n\}$ taking values in $\mathbb{X} \triangleq \mathbb{R}^q$ (which is to be encoded by the optimal randomized strategy) and described by a Gaussian Linear State Space Model (G-LSSM), as follows.

$$X_{i+1} = A_i X_i + G_i W_i, X_0 = x, i=0, \ldots, n-1$$

where $\{W_i \sim N(0; K_{W_i}): i=0, \ldots, n-1\}$ are $\mathbb{W} = \mathbb{R}^k$-valued zero mean Gaussian processes, independent of the noises driving the Gaussian-G-RCM-2 of the control system, i.e., $\{(A_i, V_i): i=0, 1, \ldots, n\}$, and the initial state $X_0$ is either fixed, i.e., $X_0=x$ or its distribution is fixed and Gaussian, i.e., $P_{X_0}(dx) \sim N(0, K_{X_0})$, and independent of $\{W_i: i=0, \ldots, n\}$.

Next, we illustrate how to transform the optimal randomized strategy of L. into an controller-encoder, and a mean-square error decoder, based on a variation of the Kalman filter.

Consider the optimal randomized strategy of L., specifically, $\{(\Gamma_{i,i-1}^*, K_{Z_i}^*): i=0, 1, \ldots, n-1,\}$, with corresponding optimal distribution $\{\pi_i^{g,*}(da_i|y_{i-1}): i=0, \ldots, n\}$ and joint process $\{(A_i^{g,*}, Y_i^{g,*}): i=0, \ldots, n\}$. Define the filter estimate and conditional covariance, for $i=0, \ldots, n$, by $$\hat{X}_{i|i-1} \triangleq E\{X_i|Y^{g,*,i-1}\},$$

$$\Sigma_{i|i-1} \triangleq E\{(X_i-\hat{X}_{i|i-1})(X_i-\hat{X}_{i|i-1})^T|Y^{g,*,i-1}\}.$$

(a) Controller-Encoder Strategy.

The following controller-encoder strategy[2] achieves the characterization of FTH information CC-Capacity. ( )

[2]For any square matrix D with real entries $D^{1/2}$ is its square root.

$$A_i^{g,*} = \bar{e}_i^*(X_i, Y^{g,*,i-1}) = \Gamma_{i,i-1}^* Y_{i-1}^{g,*} + \Delta_i^*\{X_i - \hat{X}_{i|i-1}\},$$

$$\Delta_i^* = K_{Z_i}^{*,1/2} \Sigma_{i|i-1}^{-1/2}, \Delta_i^* \succ 0,$$

$$Y_i^{g,*} = (C_{i,i-1} + D_i \Gamma_{i,i-1}^*) Y_{i-1}^{G,*} + D_i \Delta_i^* \{X_i - \hat{X}_{i|i-1}\} + V_i,$$
$$i=0,1,\ldots,n.$$

Moreover, from the properties of Kalman filter, the following hold.

(b) Filter Estimates.

The innovations process defined by $\{v_i^* t, 160\ Y_i^{g,*} - E\{Y_i^{g,*}|Y^{g,*,i-1}\}: i=0, \ldots, n\}$ satisfies $$v_i^* = Y_i^* - (C_{i,i-1} + D_i \Gamma_{i,i-1}^*) Y_{i-1}^{g,*} = D_i \Delta_i^*\{X_i - \hat{X}_{i|i-1}\} + V_i, i=0, \ldots, n,$$

$$E\{v_i^*|Y^{g,*,i-1}\} = E\{v_i^*\} = 0, i=0, \ldots, n,$$

$$E\{v_i(v_i^*)^T|Y^{g,*,i-1}\} = D_i K_{Z_i}^* D_i^T + K_{V_i} = E\{v_i^*(v_i^*)^T\}$$

and the sequence of RVs, $\{v_i^*: i=0, \ldots, n\}$ is uncorrelated.

The optimal filter estimates and conditional covariances satisfy the following recursions.

$$\hat{X}_{i+1|i} = A_i \hat{X}_{i|i-1} + \Psi_{i|i-1}\{Y_i^{g,*} - (C_{i,i-1} + D_i \Gamma_{i,i-1}^*) Y_{i-1}^{g,*}\}$$

$$= A_i \hat{X}_{i|i-1} + \Psi_{i|i-1} V_i^*, \, i=0,\,,n, \, \hat{X}_{0|-1} = \text{given},$$

$$\Sigma_{i+1|i} = A_i \sum_{i|i-1} A_i^T - A_i \sum_{i|i-1} (D_i \Delta_i^*)^T [D_i K_{Z_i}^* D_i^{T\wedge} + K_{V_i}]^{-1} \cdot (D_i \Delta_i^*) \sum_{i|i-1} A_i^T + G_i K_{W_i} G_i^T, \, \Sigma_{0|-1} = \text{given}$$

where the filter gains $\{\Psi_{i|i-1}:i=0,\ldots,n\}$ and the output process $\{Y_i^{g,*}:i=0,\ldots,n\}$ are defined by $$\Psi_{i|i-1} \triangleq A_i \Sigma_{i|i-1} (D_i \Delta_i^*)^T [D_i K_{Z_i}^* D_i^T + K_{V_i}]^{-1}$$

$$Y_i^{g,*} \triangleq (C_{i,i-1} + D_i \Gamma_{i,i-1}^*) Y_{i-1}^{g,*} + v_i^*, i=0,\ldots,n.$$

Moreover, the σ-algebra generated by $\{Y_k^{g,*}:k=0, 1, \ldots, i\}$ denoted by $\mathcal{F}_{0,i}^{Yg,*} \triangleq \sigma\{Y_0^{g,*}, Y_1^{g,*}, \ldots, Y_i^{g,*}\}$ satisfies $\mathcal{F}_{0,i}^{Yg,*} = \mathcal{F}_{0,i}^{v*} \triangleq \sigma\{v_0^*, v_1^*, \ldots, v_i^*\}, i=0,\ldots, n$.

(c) Realization of Optimal Randomize Strategy of L.

The controller-encoder strategy $\{\bar{e}_i^*(\cdot,\cdot):i=0, 1, \ldots, n\}$ realizes the optimal randomized strategy, that is $$\overset{P}{\bar{e}^*}(A_i^{g,*} \in da_i | y^{i-1}) = \pi_i^{g,*}(da_i | y_{i-1}) \sim N(\Gamma_{i,i-1}^* Y_{i-1}^{g,*}, K_{Z_i}^*), i=0, \ldots, n.$$

(d) FTH Information CC-Capacity Achieving Controller-Encoder Strategy.

The strategy $\{\bar{e}_i^*(\cdot,\cdot):i=0,\ldots,n\}$ achieves the FTF information CC-Capacity, that is, the following identities hold.

$$\lim_{n\to} \frac{1}{n+1} I(X^n \to Y^{g,*,n}) = \sum_{i=0}^{n} I(X_i; Y_i^{g,*} | Y^{g,*,i-1})$$

$$= \lim_{n\to} \frac{1}{n+1} \sum_{i=0}^{n} I(A_i^{g,*}; Y_i^{g,*} | Y^{g,*,i-1})$$

$$= \lim_{n\to} \frac{1}{n+1} \sum_{i=0}^{n} \{H(v_i^*) - H(V_i)\}$$

$$= J_{A^\infty \to Y^\infty}(\pi^{g,*}, \kappa) = C(\kappa)$$

CC-Capacity Achieving Controller-Encoder

P. Consider an example Gaussian-G-RCM-2 of M. The method of O. can be repeated by replacing $\{(\Gamma_{i,i-1}^*, K_{Z_i}^*): i=0, 1, \ldots, n-1\}$ in (a)-(d) of O. by $(\Gamma^{\infty,*}, K_Z^*)$ obtained in M.

Q. Consider the Example of N.

(a) Gaussian RV Message $X \sim N(0, \sigma_X^2)$. Then the message is $X_{i+1} = X_i, X_0 = X, i=0, \ldots, n-1$. The Rate Distortion Function (RDF) of the Gaussian RV X subject to Mean-Square Error distortion is given by $$R(\Delta) \triangleq \inf_{\hat{X}: E|X-\hat{X}|^2 \leq \Delta} I(X; \hat{X}) = \frac{1}{2} \log \max\left(1, \frac{\sigma_X^2}{\Delta}\right).$$

Let $\hat{X}_{i|i} \triangleq E\{X|Y^{g,*,i}\}, i=0, \ldots, n$ be the decoder of message X. Calculating the time-invariant scalar version (i.e., p=q=1) of optimal controller-encoder O., after (n+1) times uses of the control system, the Mean-Square Error (MSE) of the decoder decays geometrically, according to the expression $$E|X-\hat{X}_{n|n}|^2 = \sigma_X^2 e^{-2C_{0,n}(\kappa)}$$

where for large enough n, we have $C_{0,n}(\kappa)=(n+1)C(\kappa)$, and $C(\kappa)$ is the capacity of the control system given in N. for cases, |C|>1, |C|<1 (stable and unstable). Letting $\Delta = \Sigma_{n|n}$ we obtain $$R(\Delta) = C_{0,n}(\kappa).$$

This implies the controller-encoder-decoder strategy meets the RDF with equality and no other controller-encoder-decoder scheme, no matter how complex it can be, can achieve a smaller MSE. Moreover, $\lim_{n\to\infty} E|X-\hat{X}_{n|n}|^2=0$. We can also compute the error probability for any finite n.

(b) Equiprobable messages $X \in \{0, 1, \ldots, M_n\}, n=0, 1, \ldots$. Similar to (a), we can apply the Schalkwijk-Kailath coding scheme, to show for $M_n \triangleq \exp\{(n+1)R\}$ such that $$R < \frac{1}{n+1} C_{0,n}(\kappa),$$

the probability of Maximum Likelihood (ML) decoding error decreases doubly exponentially in (n+1).

(c) The analysis of the multi-dimensional versions is also feasible using the method described.

R. In the method of L.-Q.

(i) the optimal controller-encoder strategy controls the controlled process $\{Y_i:i=0,\ldots,n\}$ and encodes the information process $\{X_i:i=0,\ldots,n\}$, and (ii) the information process is reconstructed at the output of the control system, using a minimum mean-square error decoder, via the Kalman filter.

(iii)

$$C(\kappa) \triangleq \lim_{n\to\infty} \frac{1}{n+1} J_{A^n \to Y^n}(\pi^{g,*}, \kappa) = \lim_{n\to\infty} \frac{1}{n+1} I(X^n \to Y^{g,*,n})$$

is a variant of per unit time infinite horizon stochastic optimal control theory; it reveals that optimal randomized strategies are capable of information transfer, over the control system, which acts as a feedback channel, precisely as in Shannon's operational definition of Capacity of Noisy Channels.

S. The methods described in this patent, for simultaneous control and encoding of information apply to any dynamical system model with inputs and outputs, such as, biological control models, financial portfolio optimization and hedging models, quantum dynamical control systems, etc.

What is claimed is:

1. A computer-implemented method for transmitting information signals in a control system, the method comprising:

receiving, at a controller of a control system, an information signal to be propagated through the control system, where the information signal includes data to be transmitted through the control system;

determining, at the controller of the control system, a control signal to control one or more operations in the control system;

encoding, at the controller of the control system, the received information signal to produce an encoded information signal, wherein encoding the received information signal comprises:

determining a control-coding capacity of the control system based on a system model of the control system, wherein the control-coding capacity is a maximum rate of transmitting information signals through the control system, wherein determining the control-coding capacity includes solving an optimization of a representation of the control-coding capacity based on the system model, wherein the representation of the control-coding capacity includes a plurality of conditional control input distributions, and implementing a coding scheme to encode the received information signals based on the determined control-coding capacity;

transmitting, by the controller, an encoded message using the control system as a communication channel, where the encoded message comprises the control signal and the encoded information signal.

2. The computer-implemented method of claim 1, further comprising:

receiving, at one or more devices of the control system, the encoded message; and extracting, at the control system the encoded message.

3. The computer-implement method of claim 2, further comprising:

determining, at one or more devices of the control system, feedback for the controller; and transmitting, by the one or more devices of the control system to a process output signal comprising the encoded information signal.

4. The computer-implemented method of claim 3, further comprising:

receiving, at a decoder device, the process output.

5. The computer-implemented method of claim 3, further comprising:

receiving, at the controller, the process output.

6. The computer-implemented method of claim 5, wherein the process output is received at the controller after a delay.

7. The computer-implemented method of claim 1, wherein the system model of the control system comprises one or more of: power constraints, directed information pay-off, noise distributions, cost functions, feedback models, or an information rate of the control system.

8. The computer-implemented method of claim 1, wherein solving the optimization of the representation of the control-coding capacity based on the system model includes the optimal randomized control strategy to maximize a directed information pay-off, wherein the maximum of the directed-information pay-off is a supremum of all transmission rates over the system model per unit time.

9. The computer-implemented method of claim 1, wherein solving the optimization of the representation of the control-coding capacity based on the system model includes implementing a general-recursive control model.

10. The computer-implemented method of claim 1, wherein the control system is a process control system of a process plant.

11. The computer-implemented method of claim 1, wherein the control system is a dynamic system including one or more inputs, one or more outputs, and one or more controllers.

12. The computer-implemented method of claim 11, wherein the control system is one of: a car, a ship, a submarine, a missile, an airplane, or any system which is controlled by a controller.

13. The computer-implemented method of claim 1, further comprising:

receiving, at a decoder, the encoded message; and decoding, at the decoder, the encoded message based on an encoder scheme.

14. The computer-implemented method of claim 13, wherein the encoder scheme is indicated by the encoded message.

* * * * *